(12) United States Patent
Mohta et al.

(10) Patent No.: US 12,259,694 B2
(45) Date of Patent: *Mar. 25, 2025

(54) SYSTEMS AND METHODS FOR SENSOR DATA PROCESSING AND OBJECT DETECTION AND MOTION PREDICTION FOR ROBOTIC PLATFORMS

(71) Applicant: Aurora Operations, Inc., Pittsburgh, PA (US)

(72) Inventors: Abhishek Mohta, San Mateo, CA (US); Fang-Chieh Chou, Redwood City, CA (US); Carlos Vallespi-Gonzalez, Wexford, PA (US); Brian C. Becker, Pittsburgh, PA (US); Nemanja Djuric, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,210

(22) Filed: May 6, 2024

(65) Prior Publication Data

US 2024/0369977 A1 Nov. 7, 2024

Related U.S. Application Data

(63) Continuation of application No. 17/501,614, filed on Oct. 14, 2021, now Pat. No. 12,007,728.

(Continued)

(51) Int. Cl.
*G05B 13/02* (2006.01)
*B60W 50/00* (2006.01)
*B60W 60/00* (2020.01)

(52) U.S. Cl.
CPC ....... *G05B 13/0265* (2013.01); *B60W 60/001* (2020.02); *B60W 50/00* (2013.01);
(Continued)

(58) Field of Classification Search
CPC ............ G06N 3/02; G06N 3/045; G06N 3/08; G06N 20/00; G06V 10/80; G06V 10/77;
(Continued)

(56) References Cited

U.S. PATENT DOCUMENTS

| 11,422,546 | B2 * | 8/2022 | Giering | G06F 18/251 |
| 2020/0174490 | A1 * | 6/2020 | Ogale | G06N 3/045 |

(Continued)

OTHER PUBLICATIONS

Casas et al., "IntentNet: Learning to Predict Intention from Raw Sensor Data", $2^{nd}$ Conference on Robot Learning (CoRL), 2018, Zurich, Switzerland, 10 pages.

(Continued)

*Primary Examiner* — Russell Frejd
*Assistant Examiner* — Brandon Z Willis
(74) *Attorney, Agent, or Firm* — Dority & Manning, P.A.

(57) ABSTRACT

Systems and methods are disclosed for detecting and predicting the motion of objects within the surrounding environment of a system such as an autonomous vehicle. For example, an autonomous vehicle can obtain sensor data from a plurality of sensors comprising at least two different sensor modalities (e.g., RADAR, LIDAR, camera) and fused together to create a fused sensor sample. The fused sensor sample can then be provided as input to a machine learning model (e.g., a machine learning model for object detection and/or motion prediction). The machine learning model can have been trained by independently applying sensor dropout to the at least two different sensor modalities. Outputs received from the machine learning model in response to receipt of the fused sensor samples are characterized by improved generalization performance over multiple sensor modalities, thus yielding improved performance in detecting objects and predicting their future locations, as well as improved navigation performance.

20 Claims, 10 Drawing Sheets

Related U.S. Application Data

(60) Provisional application No. 63/091,401, filed on Oct. 14, 2020.

(52) U.S. Cl.
CPC ........... *B60W 2050/0052* (2013.01); *B60W 2050/0083* (2013.01); *B60W 2420/403* (2013.01); *B60W 2420/408* (2024.01); *B60W 2556/35* (2020.02)

(58) Field of Classification Search
CPC ........ G06V 10/82; G06V 20/56; G06V 20/58; G06V 2201/07; G06V 2201/08; G06F 18/25; G06F 30/27; G06F 2111/18; B60W 60/001; B60W 50/00; B60W 2050/0002; B60W 2050/0052; B60W 2050/0083; B60W 2420/403; B60W 2420/408; B60W 2556/35; G05B 13/0265; G05B 13/027; G05B 13/041; G05B 13/042

See application file for complete search history.

(56) References Cited

U.S. PATENT DOCUMENTS

| | | | |
|---|---|---|---|
| 2020/0225321 A1* | 7/2020 | Kruglick | G01S 7/417 |
| 2021/0122364 A1 | 4/2021 | Lee | |
| 2021/0304046 A1* | 9/2021 | Miki | G06N 5/045 |
| 2021/0398338 A1* | 12/2021 | Philion | G06V 10/774 |
| 2022/0026568 A1 | 1/2022 | Meuter et al. | |

OTHER PUBLICATIONS

Djuric et al., "MultiXNet: Multiclass Multistage Multimodal Motion Prediction", arXiv:2006.02000v3, 8 pages.
Fadadu et al., "Multi-View Fusion of Sensor Data for Improved Perception and Prediction in Autonomous Driving", arXiv:2008.11901v1, 10 pages.
Liang et al., "Deep Continuous Fusion for Multi-Sensor 3D Object Detection", European Conference on Computer Vision (ECCV), 2018, 16 pages.
Liu et al., "Learning End-to-End Multimodal Sensor Policies for Autonomous Navigation", arXiv:1705.10422v2, 13 pages.
Luo et al., "Fast and Furious: Real Time End-to-End 3D Detection, Tracking and Motion Forecasting with a Single Convolutional Net", IEEE CVPR, 2018, pp. 3569-3577.
Manivasagam et al., "LiDARsim: Realistic LiDAR Simulation by Leveraging the Real World", IEEE CVF Conference on Computer Vision and Pattern Recognition, 2020, pp. 11167-11176.
Meyer et al., "LaserFlow: Efficient and Probabilistic Object Detection and Motion Forecasting", arXiv:2003.05982v4, 8 pages.
Meyer et al., "Sensor Fusion for Joint 3D Object Detection and Semantic Segmentation", IEEE Conference on Computer Vision and Pattern Recognition Workshops, 2019, 8 pages.
Shah et al., "LiRaNet: End-to-End Trajectory Prediction using Spatio-Temporal Radar Fusion", arXiv:2010.00731v3, 17 pages.
Srivastava et al., "Dropout: A Simple Way to Prevent Neural Networks from Overfitting", Journal of Machine Learning Research, vol. 15, 2014, pp. 1929-1958.
Urmson et al., "Self-Driving Cars and the Urban Challenge", IEEE Intelligent Transportation Systems, Mar./Apr. 2008, pp. 66-68.
Yang et al., "RadarNet: Exploiting Radar for Robust Perception of Dynamic Objects", arXiv:2007.14366v1, 16 pages.

* cited by examiner

SYSTEMS AND METHODS FOR SENSOR DATA PROCESSING AND OBJECT DETECTION AND MOTION PREDICTION FOR ROBOTIC PLATFORMS

RELATED APPLICATION

The present application is based on and claims the benefit of U.S. Provisional Patent Application No. 63/091,401 having a filing date of Oct. 14, 2020 and U.S. patent application Ser. No. 17/501,614 having a filing date of Oct. 14, 2021, which are incorporated by reference herein.

BACKGROUND

Robots, including autonomous vehicles, can receive data that is used to perceive an environment through which the robot can travel. Robots can rely on machine-learned models to detect objects within an environment. The effective operation of a robot can depend on accurate object detection provided by the machine-learned models. Various machine-learned training techniques can be applied to improve such object detection.

SUMMARY

Aspects and advantages of embodiments of the present disclosure will be set forth in part in the following description, or may be learned from the description, or may be learned through practice of the embodiments. Aspects of the present disclosure are directed to a computing system that can be used to detect surrounding objects and their motion predictions which are critical components of a self-driving system, necessary for safe operations. In particular, sensor modalities can contribute towards the model performance. Even more particularly, sensor dropout can be used to mitigate issues such as increases in system complexity and brittle models, leading to more robust, better performing models. Thus, aspects of the present disclosure enable the computing system to leverage a sensor dropout approach to train robust models capable of jointly detecting and predicting the motion of actors using LIDAR point clouds, camera RGB images, and/or RADAR returns.

According to one example aspect, a computing system can detect surrounding objects and their motion predictions using a variety of sensor modalities. In particular, a computing system can detect surrounding objects and their motion predictions using sensor dropout. However, it is a challenging task to detect surrounding objects and their motion prediction. Multiple sensor modalities (e.g., cameras, LIDARs, RADARs, etc.) are in general leading to improved sensing systems where different sensors can complement each other. For example, cameras can help with detecting objects at longer ranges or RADAR helping to improve the velocity estimates of vehicles. However, more sensors being installed can also result in a more complex model that may be difficult to manage and maintain, as well as in a brittle system that may exhibit over-reliance on a particular sensor modality. For example, a dominant LIDAR sensor may be focused on during day operations, while ignoring other sensors.

The present disclosure resolves these challenges by providing computing systems and methods that perform detection and motion prediction using the dropout of different inputs during training. In particular, by using the dropout of different inputs during training, the computing system and method can improve in generalization performance during online operations. Even more particularly, the dropout can help limit the coupling of sensor modalities. For example, the disclosed techniques can help prevent a model from mostly relying on RADAR for vehicle detection and forcing it to also be able to detect vehicles using only LIDAR and/or image data. Even more particularly, it can also help the autonomous system handle and recover from sensor noise. For instance, sensor noise can occur when a camera is impacted by glare or when sensor input data is dropped data due to online latency or hardware issues (e.g., power interrupts, physical damage to the sensor itself, etc.), which can happen during real-world operations. Even more particularly, sensor dropout can be useful in simulation use cases. For instance, the realism gap between simulated and real sensor data can be not the same for all sensor modalities. As a result, reducing reliance on sensors where this gap is still large can help improve the quality of simulation runs, and lead to more realistic model performance in simulated environments that is transferable to the real world.

Aspects of the present disclosure can provide a number of technical improvements to robotic autonomous operations, object detection technology, and simulation. By employing dropout of different inputs during training, the proposed systems reduce computer resource usage. In particular, previous sensing systems would be required to leverage multiple sensor modalities. By employing dropout of different inputs during training, the proposed systems can reduce the coupling of sensor modalities leading to a reduction in the amount of computer operations needed to operate the sensing system, conserving computing resources such as processor usage, memory usage, network bandwidth, etc.

As another example technical effect, the proposed systems and methods allow for less reliance on availability of all sensors at all times. This is especially beneficial where the realism gap between simulated and real sensor data is not the same for all sensor modalities. Thus, by reducing the comprehensive reliance on sensors, the quality of simulation runs and improved model performance in simulated environments can be achieved.

In an aspect, the present disclosure provides a computer-implemented method for object determination. The method may comprise obtaining (e.g., by a computing system including one or more processors, etc.) sensor data from a plurality of sensors comprising at least two different sensor modalities. The method may comprise independently applying (e.g., by the computing system, etc.) sensor dropout to the at least two different sensor modalities of the sensor data. The method may comprise fusing (e.g., by the computing system, etc.) the sensor data from the at least two different sensor modalities with sensor dropout independently applied thereto to generate a fused sensor sample. The method may comprise processing (e.g., by the computing system, etc.) the fused sensor sample with at least a portion of the object detection model. The method may comprise updating (e.g., by the computing system, etc.) one or more weights of the object detection model based on labels associated with the sensor data.

In some implementations, independently applying sensor dropout to the at least two different sensor modalities of the sensor data comprises independently applying sensor dropout to each of the at least two different sensor modalities at a fixed probability associated with the sensor modality.

In some implementations, the plurality of sensors comprise a RADAR system, a LIDAR system, and a camera.

In some implementations, the at least two different sensor modalities comprise at least one of the RADAR system or the camera. In particular, independently applying sensor dropout to the at least two different sensor modalities of the sensor data comprises zeroing out a final feature vector for a portion of the sensor data obtained from the at least one of the RADAR system or the camera.

In some implementations, sensor data is obtained from the LIDAR system. In particular, independently applying sensor dropout to a portion of the sensor data obtained from one or more sensors of at least one of the at least two different sensor modalities comprises replacing a LIDAR intensity value with a sentinel value for a portion of the sensor data obtained from the LIDAR system.

In some implementations, the fixed probability associated with the sensor modality for at least one of the two different sensor modalities is zero.

In some implementations, the machine learning model comprises an end-to-end model that is configured to jointly perform object detection and motion prediction.

In some implementations, the operations may further include employing the trained machine learning model by a robotic platform operating within an environment.

In some implementations, the robotic platform comprises an autonomous vehicle.

In some implementations, the environment comprises a real-world environment or a simulated environment.

In another aspect, the present disclosure provides an autonomous vehicle control system comprising one or more processors, and one or more computer-readable medium storing instructions that when executed by the one or more processors cause the autonomous vehicle to perform operations. The operations may comprise obtaining sensor data from a plurality of sensors comprising at least two different sensor modalities. The operations may comprise fusing the sensor data from the at least two different sensor modalities to create a fused sensor sample. The operations may comprise providing the fused sensor sample as input to a machine learning model, the machine learning model having been trained by independently applying sensor dropout to the at least two different sensor modalities. The operations may comprise receiving, as an output of the machine learning model in response to receipt of the fused sensor sample provided as input, data indicative of one or more objects within an environment.

In some implementations, the plurality of sensors comprise a RADAR system, a LIDAR system, and a camera.

In some implementations, the sensor data is obtained from at least one of the RADAR system or the camera. In particular, a training of the machine learning model comprises zeroing out a final feature vector for a portion of the sensor data obtained from the at least one of the RADAR system or the camera.

In some implementations, the sensor data is obtained from the LIDAR system. In particular, a training of the machine learning model comprises replacing a LIDAR intensity value with a sentinel value for a portion of the sensor data obtained from the LIDAR system.

In some implementations, the operations further comprise controlling an autonomous vehicle (e.g., controlling a motion of an autonomous vehicle) based on the data indicative of the one or more objects within the environment.

In some implementations, the machine learning model comprises an end-to-end model that is configured to jointly perform object detection and motion prediction.

In another aspect, the present disclosure provides an autonomous vehicle comprising one or more processors and one or more computer-readable medium storing instructions that when executed by the one or more processors cause the autonomous vehicle control system to perform operations. The operations may comprise obtaining sensor data from a plurality of sensors comprising at least two different sensor modalities. The operations may comprise fusing the sensor data from the at least two different sensor modalities to create a fused sensor sample. The operations may comprise providing the fused sensor sample as input to a machine learning model for object detection and motion prediction, the machine learning model for object detection and motion prediction having been trained by independently applying sensor dropout to the at least two different sensor modalities. The operations may comprise receiving, as an output of the machine learning model for object detection and motion prediction in response to receipt of the fused sensor sample provided as input, perception data indicative of one or more states of the one or more objects within the environment and prediction data indicative of one or more predicted future locations of the one or more objects. The operations may comprise generating motion plan data for controlling the autonomous vehicle based on the perception data and the prediction data.

In some implementations, the plurality of sensors comprise a RADAR system, a LIDAR system, and a camera.

In some implementations, the sensor data is obtained from at least one of the RADAR system or the camera, and a training of the machine learning model for object detection and motion prediction comprises zeroing out a final feature vector for a portion of the sensor data obtained from the at least one of the RADAR system or the camera.

In some implementations, the sensor data is obtained from the LIDAR system, and a training of the machine learning model for object detection and motion prediction comprises replacing a LIDAR intensity value with a sentinel value for a portion of the sensor data obtained from the LIDAR system.

Other example aspects of the present disclosure are directed to other systems, methods, vehicles, apparatuses, tangible non-transitory computer-readable media, and devices for generating data (e.g., scene representations, simulation data, training data, etc.), training models, and performing other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

The following describes the technology of this disclosure within the context of an autonomous vehicle for example purposes only. As described herein, the technology is not limited to an autonomous vehicle and can be implemented within other robotic and computing systems. For example, the systems and methods disclosed herein can be implemented in a variety of ways including, but not limited to, a computer-implemented method, an autonomous vehicle system, an autonomous vehicle control system, a robotic platform system, or a general robotic device control system.

Figure 1:
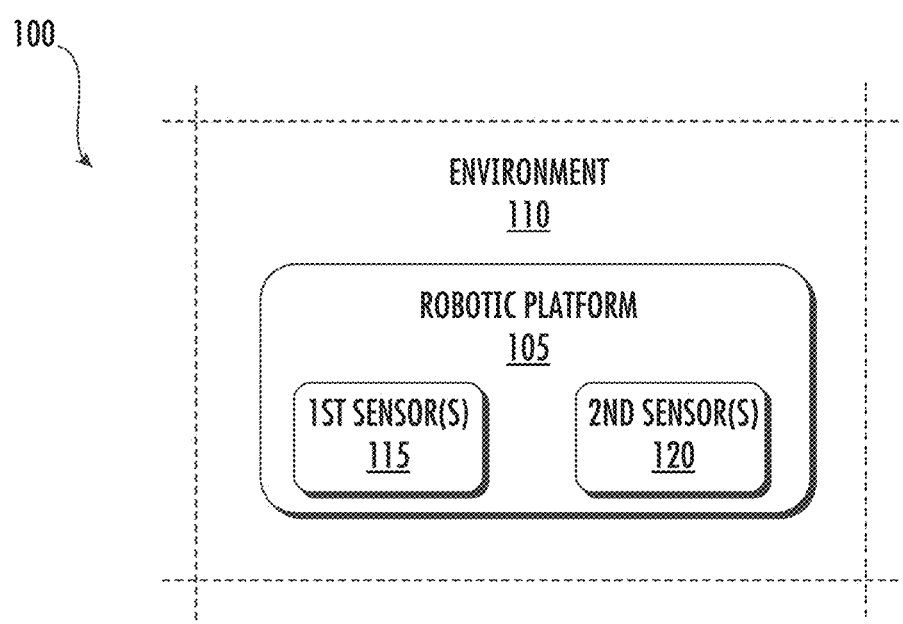
FIG. 1 depicts a block diagram of an example computing platform according to example implementations of the present disclosure.

With reference now to FIGS. 1-10, example implementations of the present disclosure will be discussed in further detail. FIG. 1 depicts a block diagram of an example operational scenario 100 according to example implementations of the present disclosure. The operational scenario 100 includes a robotic platform 105 and an environment 110. The environment 110 can be external to the robotic platform 105. The robotic platform 105, for example, can operate within the environment 110. The environment 110 can include an indoor environment (e.g., within one or more facilities, etc.) or an outdoor environment. An outdoor environment, for example, can include one or more areas in the outside world such as, for example, one or more rural areas (e.g., with one or more rural travel ways, etc.), one or more urban areas (e.g., with one or more city travel ways, etc.), one or more suburban areas (e.g., with one or more suburban travel ways, etc.), etc. An indoor environment, for example, can include environments enclosed by a structure such as a building (e.g., a service depot, manufacturing facility, etc.).

The robotic platform 105 can include one or more sensor(s) 115, 120. The one or more sensors 115, 120 can be configured to generate or store data descriptive of the environment 110 (e.g., one or more static or dynamic objects therein, etc.). The sensor(s) 115, 120 can include one or more LIDAR systems, one or more Radio Detection and Ranging (RADAR) systems, one or more cameras (e.g., visible spectrum cameras or infrared cameras, etc.), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LIDAR device, etc.).

The robotic platform 105 can include any type of platform configured to operate within the environment 110. For example, the robotic platform 105 can include one or more different type(s) of vehicle(s) configured to perceive and operate within the environment 110. The vehicles, for example, can include one or more autonomous vehicle(s) such as, for example, one or more autonomous trucks. By way of example, the robotic platform 105 can include an autonomous truck including an autonomous tractor coupled to a cargo trailer. In addition, or alternatively, the robotic platform 105 can include any other type of vehicle such as one or more aerial vehicles, ground-based vehicles, water-based vehicles, space-based vehicles, etc.

Figure 2:
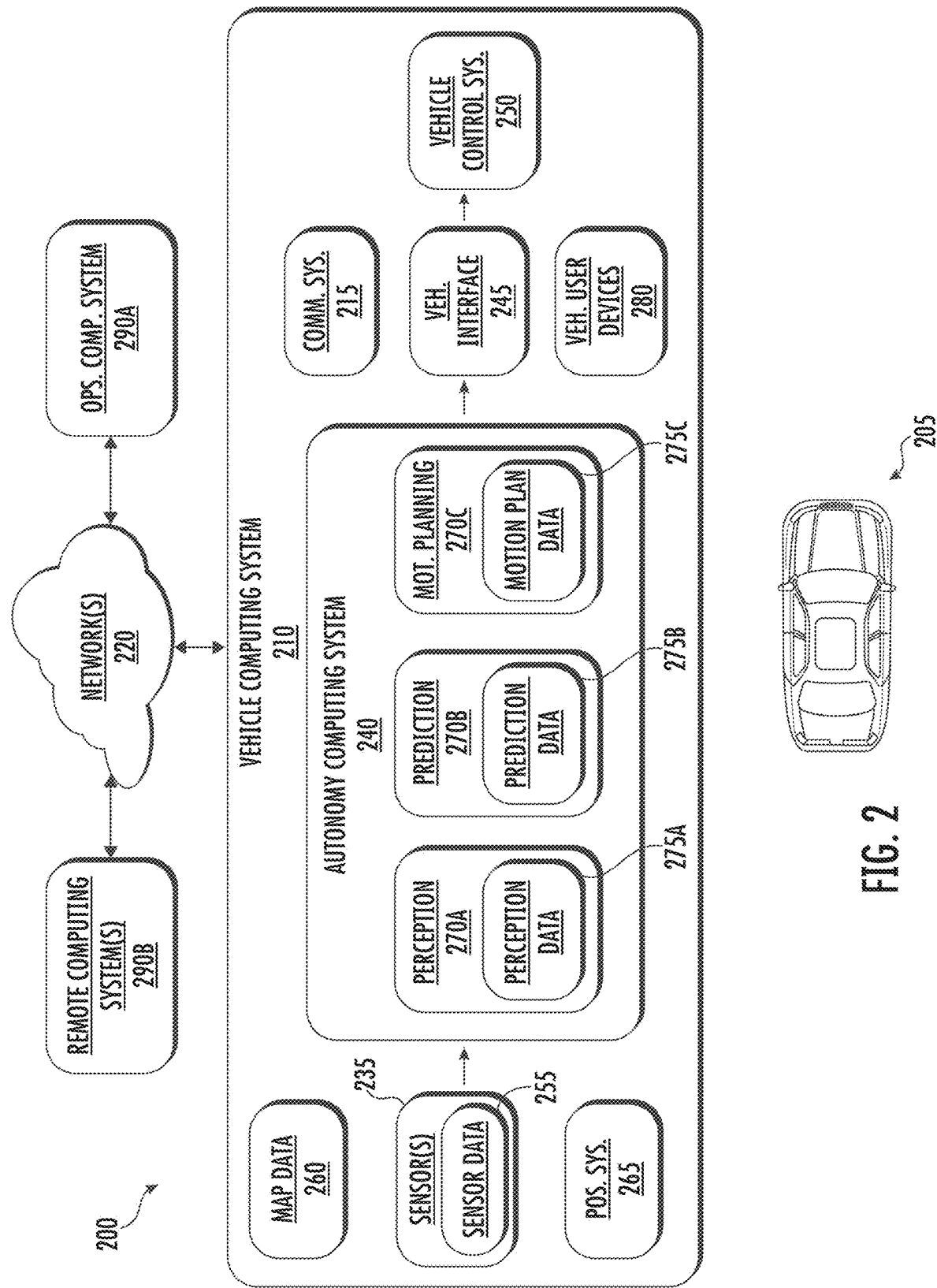
FIG. 2 depicts a block diagram of an example system according to example implementations of the present disclosure.

FIG. 2 depicts an example system overview of the robotic platform as an autonomous vehicle according to example implementations of the present disclosure. More particularly, FIG. 2 illustrates a vehicle 205 including various systems and devices configured to control the operation of the vehicle 205. For example, the vehicle 205 can include an onboard vehicle computing system 210 (e.g., located on or within the autonomous vehicle, etc.) that is configured to operate the vehicle 205. For example, the vehicle computing system 210 can represent or be an autonomous vehicle control system configured to perform the operations and functions described herein. Generally, the vehicle computing system 210 can obtain sensor data 255 from sensor(s) 235 (e.g., sensor(s) 115, 120 of FIG. 1, etc.) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1, etc.).

The vehicle 205 incorporating the vehicle computing system 200 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, etc.). The vehicle 205 can be a lightweight elective vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 (or also omitted from remote control of the vehicle 205). In some implementations, a human operator can be included in the vehicle 205.

The vehicle 205 can be configured to operate in a plurality of operating modes. The vehicle 205 can be configured to operate in a fully autonomous (e.g., self-driving, etc.) operating mode in which the vehicle 205 is controllable without user input (e.g., can drive and navigate with no input from a human operator present in the vehicle 205 or remote from the vehicle 205, etc.). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system (e.g., of a vehicle provider, fleet manager, or service entity associated with the vehicle 205, etc.) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set onboard or near the vehicle 205. For example, the vehicle computing system 210 can automatically determine when and where the vehicle 205 is to enter, change, maintain, etc. a particular operating mode (e.g., without user input, etc.). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range, etc.). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users. This can include coordinating a vehicle service provided by the vehicle 205 (e.g., cargo delivery service, passenger transport, etc.). To do so, the operations computing system 290A can communicate with the one or more remote computing system(s) 290B or the vehicle 205 through one or more communications network(s) including the communications network(s) 220. The communications network(s) 220 can send or receive signals (e.g., electronic signals, etc.) or data (e.g., data from a computing device, etc.) and include any combination of various wired (e.g., twisted pair cable, etc.) or wireless communication mechanisms (e.g., cellular, wireless, satellite, microwave, and radio frequency, etc.) or any desired network topology (or topologies). For example, the communications network(s) 220 can include a local area network (e.g., intranet, etc.), wide area network (e.g., the Internet, etc.), wireless LAN network (e.g., through Wi-Fi, etc.), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals, etc.) with one or more devices including the operations computing system 290A and the vehicle 205 through the communications network(s) 220.

The one or more remote computing system(s) 290B can include one or more computing devices such as, for example, one or more operator devices associated with one or more vehicle providers (e.g., providing vehicles for use by the service entity, etc.), user devices associated with one or more vehicle passengers, developer devices associated with one or more vehicle developers (e.g., a laptop/tablet computer configured to access computer software of the vehicle computing system 210, etc.), or other devices. One or more of the devices can receive input instructions from a user or exchange signals or data with an item or other computing device or computing system (e.g., the operations computing system 290A, etc.). Further, the one or more remote computing system(s) 290B can be used to determine or modify one or more states of the vehicle 205 including a location (e.g., a latitude and longitude, etc.), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the vehicle 205. For example, the computing device(s) can be located on or within the vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for collecting and processing sensor data in a streaming manner, performing autonomy functions, controlling the vehicle 205, communicating with other computing systems, etc.

The vehicle 205 can include a communications system 215 configured to allow the vehicle computing system 210 (and its computing device(s)) to communicate with other computing devices. The communications system 215 can include any suitable components for interfacing with one or more communications network(s) 220, including, for example, transmitters, receivers, ports, controllers, antennas, or other suitable components that can help facilitate communication. In some implementations, the communications system 215 can include a plurality of components (e.g., antennas, transmitters, or receivers, etc.) that allow it to implement and utilize multiple-input, multiple-output (MIMO) technology and communication techniques. The vehicle computing system 210 can use the communications system 215 to communicate with one or more computing devices that are remote from the vehicle 205 over the communication network(s) 220 (e.g., through one or more wireless signal connections, etc.).

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN), etc.), on-board diagnostics connector (e.g., OBD-II, etc.), or a combination of wired or wireless communication links. The onboard systems can send or receive data, messages, signals, etc. amongst one another through the communication channel(s).

In some implementations, the sensor(s) 235 can include one or more LIDAR sensor(s). The sensor(s) 235 can be configured to generate point data descriptive of a portion of a three-hundred and sixty degree view of the surrounding environment of the robot. The point data can be three-dimensional LIDAR point cloud data. In some implementations, one or more sensors 235 for capturing depth information can be fixed to a rotational device in order to rotate the sensor(s) about an axis. The sensor(s) 235 can be rotated about the axis while capturing data in interval sector packets descriptive of different portions of a three-hundred and sixty degree view of a surrounding environment of the vehicle 205. In some implementations, one or more sensors 235 for capturing depth information can be solid state.

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LIDAR sensor, etc.). The at least two different types of sensor(s) can obtain sensor data indicative of one or more static or dynamic objects within an environment of the vehicle 205.

The sensor(s) 235 can be configured to acquire sensor data 255. The sensor(s) 235 can be external sensors configured to acquire external sensor data. This can include sensor data associated with the surrounding environment of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more LIDAR systems, one or more RADAR systems, one or more cameras (e.g., visible spectrum cameras, infrared cameras, etc.), one or more motion sensors, one or more audio sensors (e.g., microphones, etc.), or other types of imaging capture devices or sensors. The sensor data 255 can include image data (e.g., 2D camera data, video data, etc.), RADAR data, LIDAR data (e.g., 3D point cloud data, etc.), audio data, or other types of data. The one or more sensors can be located on various parts of the vehicle 205 including a front side, rear side, left side, right side, top, or bottom of the vehicle 205. The vehicle 205 can also include other sensors configured to acquire data associated with the vehicle 205 itself. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, below the vehicle 205, etc. The sensor data 255 can be indicative of locations associated with the object(s) within the surrounding environment of the vehicle 205 at one or more times. The object(s) can be static objects (e.g., not in motion, etc.) or dynamic objects/actors (e.g., in motion or likely to be in motion, etc.) in the vehicle's environment. The sensor data 255 can also be indicative of the static background of the environment. The sensor(s) 235 can provide the sensor data 255 to the autonomy computing system 240, the remote computing system(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle was, is, or will be located. For example, the map data 260 can provide information regarding: the identity and location of different roadways, road segments, buildings, or other items or objects (e.g., lampposts, crosswalks or curb, etc.); the location and directions of traffic lanes (e.g., the location and direction of a parking lane, a turning lane, a bicycle lane, or other lanes within a particular roadway or other travel way or one or more boundary markings associated therewith, etc.); traffic control data (e.g., the location and instructions of signage, traffic lights, or other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high definition map data. In some implementations, the map data 260 can include sparse map data indicative of a limited number of environmental features (e.g., lane boundaries, etc.). In some implementations, the map data can be limited to geographic area(s) or operating domains in which the vehicle 205 (or autonomous vehicles generally) may travel (e.g., due to legal/regulatory constraints, autonomy capabilities, or other factors, etc.).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, WiFi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform the following functions: perception 270A, prediction 270B, and motion planning 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, or other systems that cooperate to perceive the surrounding environment of the vehicle 205 and determine a motion plan for controlling the motion of the vehicle 205 accordingly. In some implementations, one or more of the perception, prediction, or motion planning functions 270A, 270B, 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

The vehicle computing system 210 (e.g., the autonomy computing system 240, etc.) can identify one or more objects that are within the surrounding environment of the vehicle 205 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing the perception function 270C, using a perception system, etc.) can process the sensor data 255, the map data 260, etc. to obtain perception data 275A. The vehicle computing system 210 can generate perception data 275A that is indicative of one or more states (e.g., current or past state(s), etc.) of one or more objects that are within a surrounding environment of the vehicle 205. For example, the perception data 275A for each object can describe (e.g., for a given time, time period, etc.) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. The perception data 275A can be utilized for the prediction function 270B of the autonomy computing system 240.

The vehicle computing system 210 can be configured to predict a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the prediction function 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points. In some implementations, the prediction data 275B can be indicative of the speed or acceleration at which the respective object is predicted to travel along its associated predicted motion trajectory. The vehicle computing system 210 can utilize one or more algorithms or machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). The prediction data 275B can be utilized for the motion planning function 270C of the autonomy computing system 240.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more way points (with associated coordinates). The way point(s) can be future locations for the vehicle 205. The planned vehicle motion trajectories can indicate the path the vehicle 205 is to follow as it traverses a route from one location to another. Thus, the vehicle computing system 210 can take into account a route/route data when performing the motion planning function 270C.

The vehicle computing system 210 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 210 can determine that the vehicle 205 can perform a certain action (e.g., pass an object, etc.)

without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The motion planning function 270C can generate cost data associated with such trajectories. In some implementations, one or more of the predicted motion trajectories or perceived objects may not ultimately change the motion of the vehicle 205 (e.g., due to an overriding factor, etc.). In some implementations, the motion plan may define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C/motion plan(s) for the vehicle 205 (e.g., multiple times per second, etc.). Each new motion plan can describe a motion of the vehicle 205 over the next planning period (e.g., waypoints/locations(s) over the next several seconds, etc.). Moreover, a motion plan may include a planned vehicle motion trajectory. The motion trajectory can be indicative of the future planned location(s), waypoint(s), heading, velocity, acceleration, etc. In some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan. The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store onboard the vehicle 205 to another vehicle.

The vehicle computing system 210 can include the one or more vehicle user devices 280. For example, the vehicle computing system 210 can include one or more user devices with one or more display devices located onboard the vehicle 205. A display device (e.g., screen of a tablet, laptop, smartphone, etc.) can be viewable by a user of the vehicle 205 that is located in the front of the vehicle 205 (e.g., driver's seat, front passenger seat, etc.). Additionally, or alternatively, a display device can be viewable by a user of the vehicle 205 that is located in the rear of the vehicle 205 (e.g., a back passenger seat, etc.). The user device(s) associated with the display devices can be any type of user device such as, for example, a tablet, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models to perform the perception 270A, prediction 270B, or motion planning 270C functions. The machine-learned model(s) can be previously trained through one or more machine-learned techniques. The machine-learned models can be previously trained by the one or more remote computing system(s) 290B, the operations computing system 290A, or any other device (e.g., remote servers, training computing systems, etc.) remote from or onboard the vehicle 205. For example, the one or more machine-learned models can be learned by a training computing system over training data stored in a training database. The training data can include, for example, sequential sensor data indicative of an environment (and objects/features within) at different time steps. In some implementations, the training data can include a plurality of environments previously recorded by the autonomous vehicle with one or more objects, static object(s) or dynamic object(s).

To help improve the performance of a robotic platform, such as an autonomous vehicle of FIG. 2, the technology of present disclosure can leverage sensor data packet processing to generate updated spatial data of a surrounding environment. Using the technology of the present disclosure, a sensor data packet can be processed to generate a two-dimensional representation, which can be processed to generate a local feature map which is then used to update a spatial map for object determination, or detection.

Figure 3:
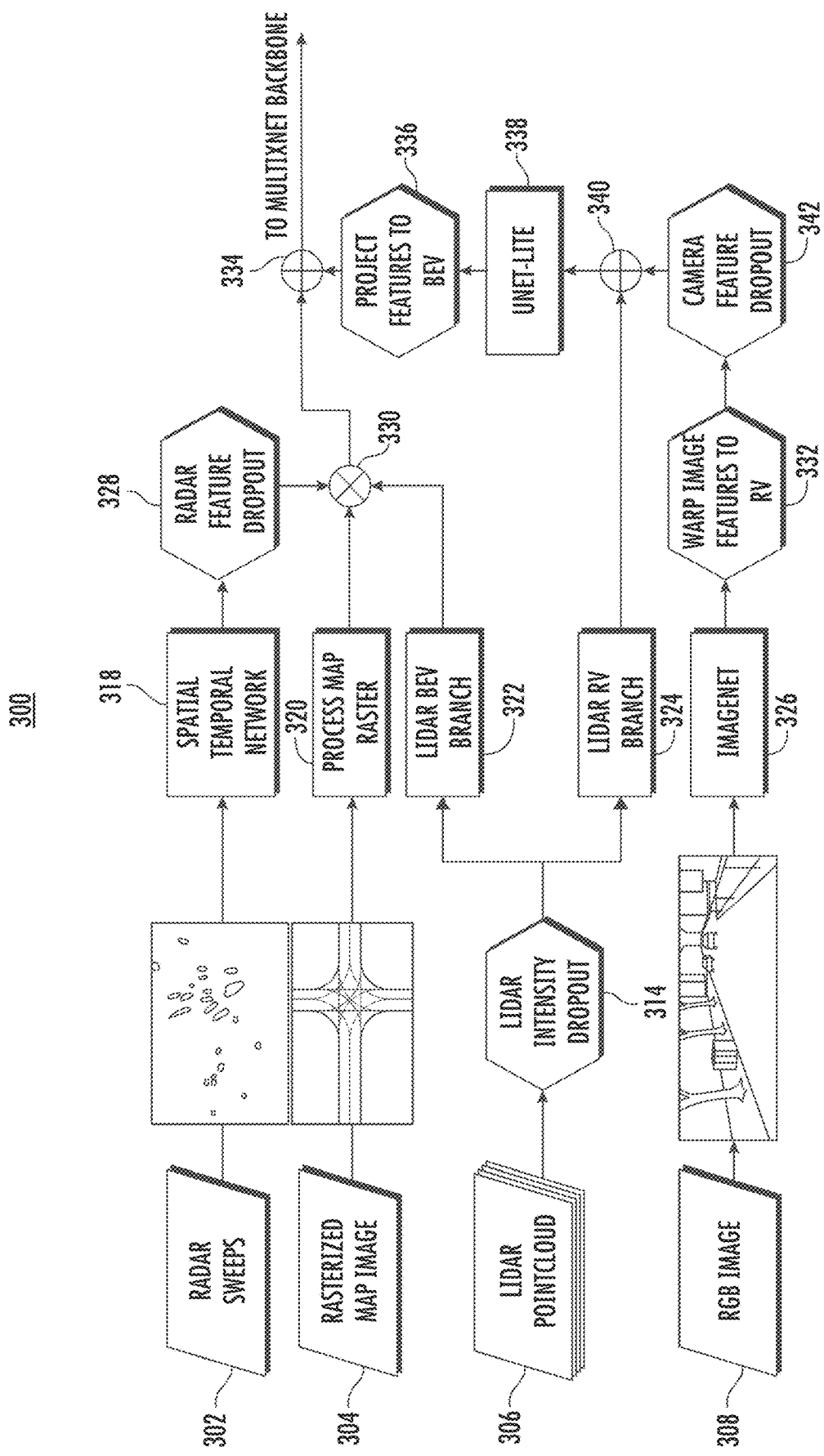
FIG. 3 depicts an example sensor data processing architecture according to example implementations of the present disclosure.

For example, FIG. 3 depicts an example system 300 configured to detect and predict the motion of objects within the surrounding environment of a system such as an autonomous vehicle according to example implementations of the present disclosure. As further described herein, the network architecture can be indicative of at least a portion of an environment in which a robotic platform operates. The system 300 can include any of the system(s) (e.g., robotic platform 105, vehicle 205, vehicle computing system 210, remote computing system 290B, operations computing system 290A, etc.) described herein such as, for example, with reference to FIGS. 1, 2, etc. The system 300 can be configured to process sensor data to fuse sensor data from at least two different sensor modalities to create a fused sensor sample to determine one or more objects and predict their motion in the surrounding environment.

To do so, the system 300 can use multiple inputs. For example, the multi-view architecture can have at least one LIDAR input 306, (e.g., LIDAR point cloud, etc.). In particular, the LIDAR point cloud can be converted into appropriate feature representations that can be ingested by deep models. For example, the points can be treated as an unordered set of point-wise feature vectors. Even more particularly, the LIDAR input 306 can undergo a LIDAR intensity dropout 314. At LIDAR intensity dropout 314, units (e.g., hidden and visible) can be dropped out (e.g., temporarily removed from the network) along with all its incoming and outgoing connections. The choice of which units to drop is random. For example, each unit can be retained with a fixed probability independent of other units, where the probability can be chosen using a validation set or can simply be set (e.g., at 0.5). Specifically, dropout can be applied to graphical models (e.g., Boltzmann Machines). Applying the LIDAR intensity dropout 314 can amount to sampling a "thinned" LIDAR network where the thinned network includes all the units that survived dropout.

In particular, a neural net with n units can be seen as a collection of $2^n$ possible thinned neural networks. Those networks can all share weights such that the total number of parameters is still $O(n^2)$. For example, applying sensor dropout to LIDAR can use LIDAR point positions to perform multi-view projection. As an example, projection can be computed as follows:

$$F_{target}(x) = \frac{\sum_{i=1}^{N} 1_{x=P_{target}(L_i)} F_{source}(P_{source}(L_i))}{\sum_{i=1}^{N} 1_{x=P_{target}(L_i)}}$$

Where $F_{target}$ and $F_{source}$ can be feature maps in the target and source views, respectively, represented as 2D grids and indexed by a cell index, while x denotes a cell index within the target grid. $P_{target}$ and $P_{source}$ can be projection operators that project LIDAR point $L_i$ onto the corresponding view and return the cell index in that view. Scalar N can be the total number of LIDAR points in a sweep, while $1_c$ can be an indicator function which equals 1 when condition c is true and 0 otherwise. In other words, LIDAR points can be used to extract features from the source view and project them into the target view, then an average pooling can be applied if multiple LIDAR points are projected into the same target cell.

As a further example, the LIDAR data may not be dropped completely and can instead improve model robustness to LIDAR intensity.

In some implementations, the multi-view architecture can have a LIDAR BEV branch which consists of LIDAR BEV branch data 322. In particular, features can be extracted separately from voxelized multi-sweep LIDAR data on one side and rasterized HD map on the other. Even more particularly, the two sets of features can then be summed, before being sent downstream to a first-stage backbone network. Specifically, multiple past sweeps (e.g., 10) of LIDAR can be voxelized onto a BEV grid, then fused with rasterized HD map channels and RADAR features extracted with a spatio-temporal network. As an example, the input feature for each sweep can be:

$$\left[\frac{L}{\Delta L}\right] \times \left[\frac{W}{\Delta W}\right] \times T \left[\frac{V}{\Delta V}\right],$$

where length L, width W, and height V define the area of interest in a 3D physical space. Furthermore, T−1 past sweeps can be encoded into the same BEV frame and the feature maps can be stacked along the channel dimensions.

In some implementations, the multi-view architecture can have LIDAR RV branch which comprises LIDAR RV branch data 324. For example, the LIDAR points can be rasterized into a 2D RV image following feature extraction with a CNN which can be fused with the camera image features. In particular, the LIDAR RV branch data 324 can consume LIDAR point-cloud data. Even more particularly, an RV image can be constructed from the LIDAR point cloud. Even more particularly, the constructed RV image can be processed by two convolutional layers with a matrix (e.g., a kernel) without stride.

In some implementations, in parallel, features can be extracted from the RGB camera image 308 with a light-weight image database (e.g., ImageNet 326) which can include multiple layers of convolutions. For example, each of the convolution layers can include a matrix and stride. As another example, every alternate layer can include a matrix and stride. In particular, extracted camera features can be projected or warped to the RV to produce warped image features 332. Following the extracted camera features being projected or warped to the RV to produce warped image features 332, camera features can undergo camera feature dropout to obtain camera feature dropout data 342. To obtain camera feature dropout data 342, units (e.g., hidden and visible) can be dropped out (i.g., temporarily removed from the network) along with all its incoming and outgoing connections. Even more particularly, the extracted camera features can be concatenated with the LIDAR RV features at camera and LIDAR RV concatenation point 340. In particular, a binary indicator encoding whether the RV cell contains a valid camera projection (e.g., a 1 for a valid projection, a −1 for an invalid projection) can also be concatenated at camera and LIDAR RV concatenation point 340.

In some implementations, a multi-scale convolutional network (e.g., U-Net Lite 338) can be applied to the concatenated features. The convolutional network can be used to jointly extract camera and LIDAR features. The convolutional network can process the features at a scale. For example, the convolutional network can process the features at 2 scales (e.g., down-scaling 2× horizontally and double the channel size). In particular, a residual block with skip connection can be used as a processing block at each level. Even more particularly, a deconv layer for feature upsampling can follow the residual block.

In some implementations, the multi-view architecture can have a RADAR sweep input 302. In particular, multiple RADAR sensors can be used. Even more particularly, a RADAR sweep input 302 can be created such that the RADAR sweep input 302 contains measurements from all RADARs in a time interval. Even more particularly, RADAR points can be transformed into a coordinate frame associated with the most recent sweep. For example, for each RADAR point in the RADAR sweep input 302, a feature vector can be calculated containing its 2D position, RADAR cross section and ego-motion compensated radial velocity. Specifically, multiple modules can be used to learn features from RADAR points for BEV cells (e.g., spatial temporal network 318).

In some implementations, the spatial module in the spatial temporal network 318 module can work on each sweep individually and provide robustness to sparsity and position errors observed in RADAR points. In particular, the spatial module in the spatial temporal network 318 can extract BEV features for each cell in the BEV grid using a single sweep of RADAR points. Even more particularly, the grid can be chosen to be centered at the ego-vehicle position at the most recent sweep. Specifically, an appropriate resolution for feature learning can be selected. Even more specifically, parametric continuous convolutions can be used to compute the BEV cell features. The parametric convolution can generalize the standard convolution operator to non-grid like structure. The parametric convolution can handle different input and output domains with pre-defined correspondence between them. As an example, the features $h_j^m$ can be calculated for the sweep by:

$$h_j^m = \sum_{i \in A_j^m} g^m(f_i^m \oplus (x_i^m - x_j^m))$$

Where $A_j^m$ can be the associated set of RADAR points, $x_i^m$ can be the 2D coordinates of the associated RADAR point, $x_j^m$ can be the 2D coordinate of the BEV cell's center, $\oplus$ denotes the concatenation operation, $f_i^m$ can be the feature vector for the RADAR point and $g^m(\bullet)$ can be a multi-layer perceptron (MLP) with learnable weights shared across all the cells. $A_j^m$ can be calculated using the nearest neighbor algorithm with a distance threshold larger than the size of a cell.

In some implementations, the temporal learning module in the spatial temporal network 318 can provide robustness to radial velocity observation by using a sequence of sweeps to implicitly recover full 2D velocity of objects. In particular, the temporal learning module in the spatial temporal network 318 can combine spatial features for all the sweeps. For example, for each cell a spatio-temporal feature vector can be calculated by concatenating the per sweep features and using an MLP to combine them.

In some implementations, RADAR feature dropout data 328 can be obtained by applying dropout to the RADAR sweep input 302 that is run through the spatial temporal network 318. In particular, the RADAR feature dropout data 328 can be applied to improve the robustness of the model.

In particular, the dropout can be performed differently for each sensor modality. For example, camera feature dropout data 342 and RADAR feature dropout data 328 can be obtained by zeroing out the corresponding final feature vector before sensor fusion. As another example, for LIDAR intensity, the LIDAR intensity can be replaced with a sentinel value (e.g., set to the mean LIDAR intensity computing from the training samples).

In some implementations, dropout neural networks can be trained using stochastic gradient descent in a manner similar to standard neural nets. In particular, a thinned network can be used by dropping out units. Even more particularly, forward and backpropagation can be done on this thinned network. The gradients for each parameter can be averaged. Specifically, any case which does not use a parameter may contribute a gradient of zero for that parameter. Many methods have been used to improve stochastic gradient descent such as momentum, annealed learning rates and L2 weight decay. Those methods were found to be useful for dropout neural networks as well. In particular, although dropout alone gives significant improvements, in some cases using dropout along with maxnorm regularization, large decaying learning rates and high momentum provides a significant boost over just using dropout.

In some implementations, neural networks can be pre-trained using stacks of RBMs, autoencoders or Deep Botzmann Machines. In particular, pretraining can use unlabeled data. Even more particularly, pretraining can be followed by backpropagation. Furthermore, dropout can be applied to finetune nets that have been pretrained using these techniques. In particular, the weights obtained from pretraining can be scaled such that for each unit, the expected output under random dropout can be the same as the output during pretraining.

In some implementations, a rasterized map data 304 is input. In particular, a BEV representation of an HD map can be obtained by rasterization. Even more particularly, static map elements can be encoded in the same frame as the BEV LIDAR grid. Static map elements can include driving paths, crosswalks, lane and road boundaries, interactions, driveways, and parking lots, where each element is encoded as a binary mask in its own separate channel. The rasterized map data 304 must then be input into a process map raster to obtain processed map raster data 320.

In some implementations, the RADAR feature dropout data 328, processed map raster data 320, and LIDAR BEV branch data 322 can be fused at RADAR, map, LIDAR fusion point 330 to produce the BEV feature map. Finally, BEV projected features data 336 can be fused with the BEV feature map at the feature tensor fusion point 334 to produce feature tensor fusion data. Specifically, the fused feature tensor data can be processed with additional convolutions to output detections and motion predictions for each actor.

Figure 4:
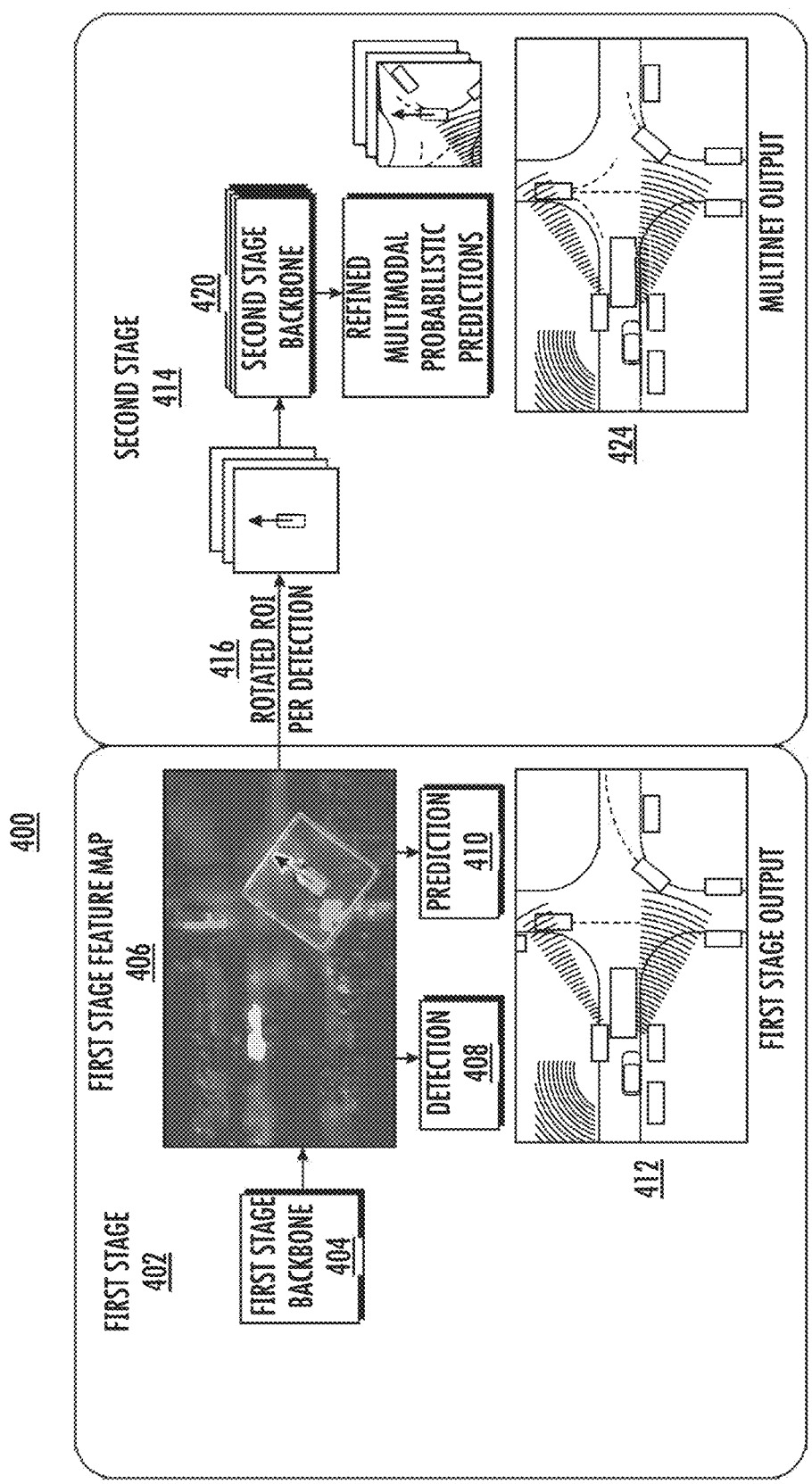
FIG. 4 depicts an example machine-learned model for joint detection and motion prediction, that can be trained with sensor dropout techniques according to example implementations of the present disclosure.

FIG. 4 depicts an example system configured as a machine-learned model 400 for joint detection and motion prediction, that can be trained with sensor dropout techniques according to example implementations of the present disclosure. As further described herein, the machine-learned model 400 can be indicative of at least a portion of an environment in which a robotic platform operates. The machine-learned model 400 can be used by any of the system(s) (e.g., robotic platform 105, vehicle 205, vehicle computing system 210, remote computing system 290B, operations computing system 290A, etc.) described herein such as, for example, with reference to FIGS. 1, 2, etc. The machine-learned model 400 can be configured to output data relating to joint detection and motion prediction.

To do so, the machine-learned model 400 can first leverage a first stage 402. In the first stage 402 the machine-learned model 400 can provide feature tensor fusion data from as input to first stage backbone network 404. As a particular example, the feature tensor fusion data can originate from feature tensor fusion point 334 in FIG. 3. The first stage backbone network 404 can include a BEV image first stage feature map 406. In particular, the BEV image first stage feature map 406 can be viewed as a top-down grid representation of the SDV's surroundings, wherein each cell can include input features encoded along the channel dimensions. Even more particularly, the BEV image first stage feature map 406 can be processed by a sequence of 2-D convolutional layers. Specifically, the image can be processed by a sequence of 2-D convolutional layers until a final layer containing learned featured for each cell location.

In some implementations, following a 1×1 convolutional layer, for each cell, a set of outputs can be predicted (e.g., two) to comprise the first stage output data 412. In particular, the set of outputs comprising the first stage output data 412 can include object detection data 408 and object motion prediction data 410 wherein object detection data 408 and object motion prediction data 410 can represent object detection and its movement prediction. Even more particularly, object detection data 408 for a cell centered at (x, y) can comprise an existence probability $\hat{p}$, oriented bounding box. Specifically, the existence probability $\hat{p}$, oriented bounding box can be represented by its center $c_0 = (\hat{c}_{0x}, \hat{c}_{0y})$ relative to the cell center, size represented by length $\hat{l}$ and width $\hat{w}$, and heading $\widehat{\theta_0}$ relative to the x-axis, parameterized as a tuple (sin $\widehat{\theta_0}$, cos $\widehat{\theta_0}$). Specifically, the object motion prediction data 410 can be composed of bounding box centers (or waypoints) $\widehat{c_h} = (\widehat{c_{hx}}, \widehat{c_{hy}})$ and headings $\widehat{\theta_h}$ at H future time horizons, with h∈ {1, . . . , H}. Even more specifically, a full set of H waypoints can be denoted as a trajectory $\hat{\tau} = \{\widehat{c_h}, \widehat{\theta_h}\}_{h=1}^{H}$. For example, the bounding box size can be considered constant across the entire prediction horizon.

In some implementations, the loss at a certain time step can include detection and prediction losses computed over all BEV cells. In particular, a binary focal loss $\ell_{focal}(\hat{p})$ can be used for object probability with a hyper-parameter γ set to a particular value (e.g., 2) to perform the per-pixel detection loss. Even more particularly, the binary focal loss $\ell_{focal}(\hat{p})$ with the hyper-parameter γ set to a particular value (e.g., 2) can be empirically found to perform well in order. Specifically, when there exists a ground-truth object in a particular cell a smooth $-\ell_1$ regression loss $\ell_1(\hat{v}-v)$ can be used for all bounding box parameters (e.g., center, size, and heading), where the loss can be computed between the predicted value $\hat{v}$ and the corresponding ground truth v. The smooth $-\ell_1$ regression loss can be used to capture prediction errors of future bounding box centers and headings. Furthermore, the overall loss at horizon h for a cell with a foreground (fg) object $L_{fg(h)}$ can be:

$$L_{fg(h)} = 1_{h=0}(\ell_{focal}(\hat{p}) + \ell_1(\hat{l} - l) + \ell_1(\hat{w} - w)) +$$
$$\ell_1(\hat{c}_{hx} - c_{hx}) + \ell_1(\hat{c}_{hy} - c_{hy}) + \ell_1(\sin\hat{\theta}_h - \sin\theta_h) + \ell_1(\cos\hat{\theta}_h - \cos\theta_h),$$

where $1_c$ can equal 1 if the condition c is true and 0 otherwise, while the loss for a background (bg) cell not containing a foreground object can be equal to $L_{fg(h)} = \ell_{focal}(\hat{p})$.

In some implementations, to enforce a lower error tolerance for earlier horizons the per-horizon losses can be multiplied by fixed weights that are gradually decreasing for future timesteps, and the per-horizon losses can be aggregated to obtain the final loss:

$$L = 1_{bg\,cell}L_{bg} + 1_{fg\,cell}\sum_{h=0}^{H}\lambda^{h}L_{fg(h)}$$

where λ∈ (0, 1) can be a constant decay factor (for example, the constant decay factor can be set to 0.97 in our experiments). The loss can contain both detection and prediction components, and all model parameters are learned jointly in an end-to-end manner.

In some implementations, the machine-learned model 400 can learn trajectories and uncertainties jointly, where the position uncertainty in the along-track (AT) and cross-track (CT) directions can decompose. In particular, a predicted waypoint $\hat{c}_h$ can be projected along AT and CT directions by considering the ground-truth heading $\theta_h$, and the errors along these directions can be assumed to follow a Laplace distribution Laplace(μ, b), where PDF of a random Laplacian variable v can be computed as:

$$\frac{1}{2b}\exp\left(-\frac{|v-\mu|}{b}\right)$$

where mean μ and diversity b can be the Laplace parameters. Even more particularly, AT and CT errors can be assumed as independent, with each having a separate set of Laplace parameters. For example, AT can assume an error value $\hat{e}_{AT}$, this can define a Laplace distribution Laplace $(\hat{e}_{AT}, \hat{b}_{AT})$. Furthermore, the loss can be minimized by minimizing the Kullback-Leibler (KL) divergence between the ground-truth Laplace (0, $b_{AT}$) and the predicted Laplace $(\hat{e}_{AT}, \hat{b}_{AT})$, wherein minimizing the Kullback-Leibler (KL) divergence between the ground-truth Laplace (0, $b_{AT}$) and the predicted Laplace $(\hat{e}_{AT}, \hat{b}_{AT})$ can be computed as follows:

$$KL_{AT} = \log\frac{\hat{b}_{AT}}{b_{AT}} + \frac{b_{AT}\exp\left(-\frac{|\hat{e}_{AT}|}{b_{AT}}\right) + |\hat{e}_{AT}|}{b_{AT}} - 1.$$

Similarly, $KL_{CT}$ can be computed for the CT errors, and KLAT and KLCT can be used instead of the smooth $-\ell_1$ loss for bounding box centers introduced in the previous section.

In some implementations, the ground-truth diversity can be linearly increased with time, $$b_*(t) = \alpha_* + \beta_* t$$

where parameters α, and β, can be empirically determined, with separate parameters for AT and for CT components. This can be achieved by training models with varying α, and β, and choosing the parameter set for which reliability diagrams indicate that the model outputs are the most calibrated.

In some implementations, in response to the object detection data 408 and object motion prediction data 410, a second stage 414 can be leveraged where further refinement of motion prediction for the detected objects can be performed. In particular, the second stage 414 can discard the object detection data 408 and object motion prediction data 410 and instead take the inferred object center $\hat{c}_0$ and heading $\hat{\theta}_0$, as well as the final feature layer from the main network. The second stage 414 can then take the learned features and crop and rotate for each actor, such that the actor is oriented pointing up in the rotated image to output a rotated ROI per detection image 416. Even more particularly, the cropped and rotated feature map can be associated with the second stage backbone network 420 which can be fed through a lightweight CNN network (e.g., before the final prediction of future trajectory and uncertainty is performed). Specifically, both first stage 402 and second stage 414 networks can be trained jointly. Even more specifically, portions of the first stage 402 and second stage 414 can be used. For example, the full loss L in the first stage 402 and the future prediction loss in the second stage 414 can be used. Continuing the example, the second stage 414 prediction can be used as a final output trajectory, or the final output data 424.

In some implementations, the output can be standardized in the actor frame. In some implementations, in the first stage 402 the output trajectories can radiate in any direction from the actor position, while in the actor frame the majority of the future trajectories grow from the origin forward. In addition, the second stage 414 can concentrate on extracting features for a single actor of interest and discard irrelevant information. For example, a purpose of a two-stage approach as depicted in FIG. 4 can be to refine the trajectories and not the detections.

In some implementations, the machine-learned model 400 can output a fixed number of M trajectories. In particular, trajectory modes output by the machine-learned model 400 can be denoted as $\{\hat{p}_m\}_{m=1}^{M}$. Even more particularly, one of the M modes can be identified as a ground-truth mode, $m_{gt}$. Specifically, a novel direction-based policy can be designed to decide the ground-truth mode. More specifically, an angle $\Delta_\theta = \theta_H - \theta_0$, can be computed between the last and current ground-truth heading where $\Delta_\theta \in (-\pi, \pi]$. Furthermore, the range $(-\pi, \pi]$ can be divided into M bins such that $m_{gt}$ can be decided based on where $\Delta_\theta$ falls. In this way, during training, each mode can be specialized to be responsible for a distinct behavior (e.g., for M=3, a left, right, and straight going mode can be present)

In some implementations, the multimodal trajectory loss can include a trajectory loss of the $m_{gt}$-th trajectory mode and a cross-entropy loss for the trajectory probabilities computed as:

$$L_{\tau,cls} = -\sum_{m=1}^{M} 1_{m=m_{gt}} \log \hat{p}_m$$

In particular, unimodal prediction loss can be continued to use in the first stage to improve the model training. Even more particularly, the multimodal trajectory loss can be applied to train the second-stage network.

In some implementations, multiple actor type behaviors can be modeled simultaneously. In particular, vehicles, pedestrians, and bicyclists. Even more particularly, each set of outputs can be separated after the backbone networks 404 and 420 compute the shared BEV learned features. For example, in some cases (e.g., pedestrians, bicyclists, etc.) a unimodal output can result in a better performance, thus the multimodal loss and refinement stage can be not used in those cases. Continuing the example, M can be set for 3 in cases where multimodal loss and refinement is used and 1 for unimodal use. Specifically, the final loss of the model can be the sum of per-type losses where each per-type loss can include detection loss as well as uncertainty-aware trajectory loss.

Figure 5:
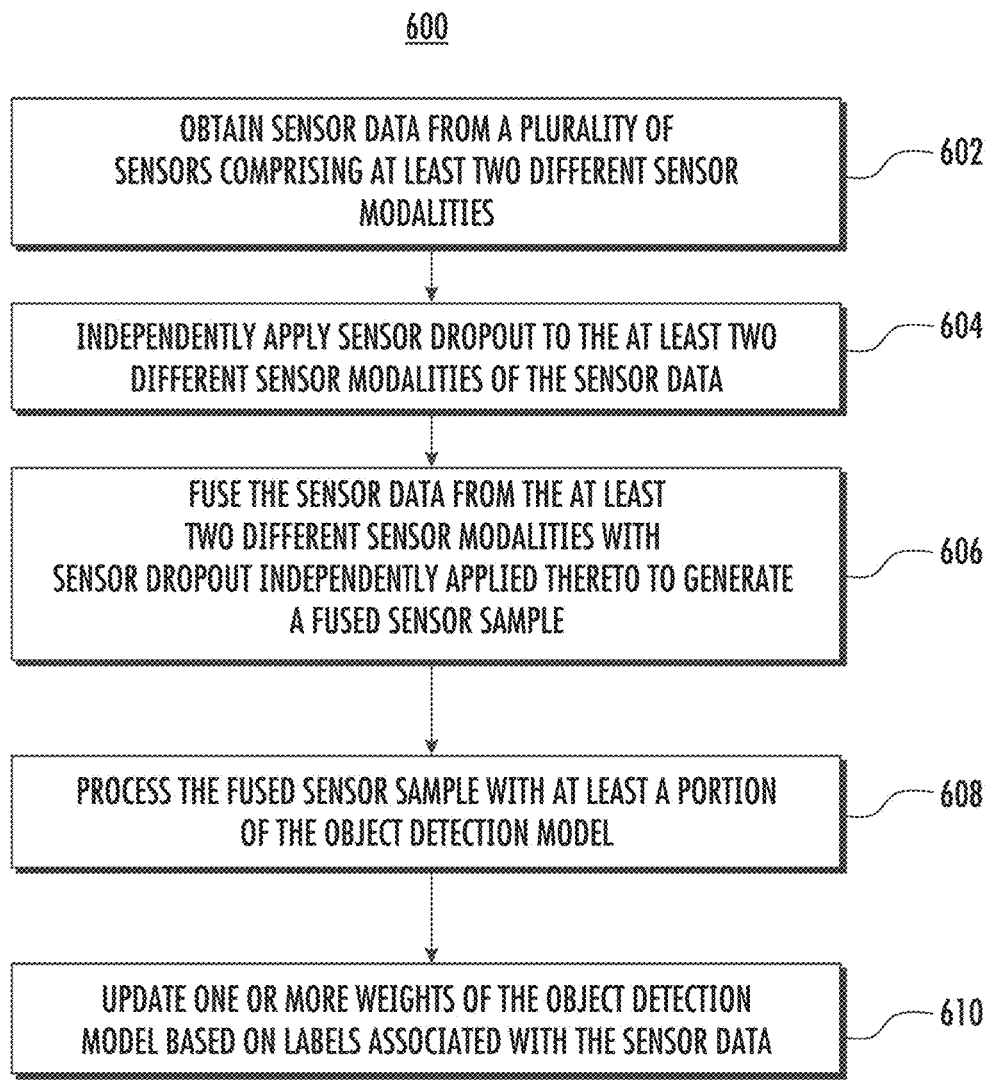
FIG. 5 depicts a flowchart of an example method for training a machine learning model using sensor dropout according to aspects of the present disclosure.

FIG. 5 depicts a flowchart of a method 600 for training a machine learning model using sensor dropout according to aspects of the present disclosure. One or more portion(s) of the method 600 can be implemented by a computing system that includes one or more computing devices such as, for example, the computing systems described with reference to the other figures (e.g., robotic platform 105, vehicle computing system 210, operations computing system(s) 290A, remote computing system(s) 290B, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1-3, 8, etc.), for example, to generate object determination data and object motion data. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 5 is described with reference to elements/terms described with respect to other systems and figures for exemplary illustrated purposes and is not meant to be limiting. One or more portions of method 600 can be performed additionally, or alternatively, by other systems.

At 602, the method 600 can include obtaining sensor data from a plurality of sensors comprising at least two different sensor modalities. In particular, the sensor data can be obtained of a surrounding environment by employing a robotic platform (e.g., a three-hundred-and-sixty-degree view). The robotic platform can include an autonomous vehicle. For example, a computing system (e.g., robotic platform 105, vehicle computing system 210, operations computing system(s) 290A, remote computing system(s) 290B, etc.) can obtain sensor data. As another example, the environment can include a real-world environment or a simulated environment. In some instances, the sensor data obtained at 602 can include radar sweep input 302, rasterized map data 304, lidar input 306, and RGB camera image 308 as depicted in FIG. 3.

At 604, the method 600 can include independently applying sensor dropout to the at least two different sensor modalities of the sensor data (e.g., point cloud data of LIDAR sensor(s), RADAR sensor(s), cameras, etc.). In some instances, the sensor dropout independently applied at 604 can correspond to one or more of the LIDAR intensity dropout data 314, radar feature dropout data 328, and/or camera feature dropout data 342 depicted in FIG. 3. More particularly, independently applied sensor dropout means that sensor dropout can be applied to a first sensor modality in a manner that is independent of when and/or how sensor dropout can be applied to additional (e.g., second, third, fourth, etc.) sensor modalities. As one example, the independent sensor dropout can be applied with a fixed probability to one or more of the sensor modalities. As another example, the sensor dropout can be applied to sensor data obtained from the RADAR system and/or the camera by zeroing out a final feature vector for a portion of the sensor data. As yet another example, sensor dropout can be applied to the sensor data obtained from the LIDAR system by replacing a LIDAR intensity value with a sentinel value for a portion of the sensor data.

At 606, the method 600 can include fusing the sensor data from the at least two different sensor modalities with sensor dropout independently applied thereto to generate a fused sensor sample. For example, creating a fused sensor sample can include fusing a first portion of the sensor data from a first branch comprising a range-view (RV) representation with a second portion of the sensor data from a second branch comprising a bird's-eye view (BEV) representation, as depicted in FIG. 3. In some instances, the fused sensor sample created at 606 can correspond to the feature tensor fusion data created at feature tensor fusion point 334 of FIG. 3. In particular, fusion weights can be adjusted, such that the computing system can create a fused sensor sample with more weight on one of the at least two different sensor modalities.

At 608, the method 600 can include processing the fused sensor sample with at least a portion of the object detection model. For example, the fused sensor sample can correspond with first stage backbone data 404 and the object detection model can correspond with outputting detection data 408 in FIG. 4. In particular, the first stage backbone data 404 can be processed with at least a portion of the object detection model to obtain detection data 408. In particular, the fused sensor sample can be obtained through a neural network, wherein the neural network can be considered a part of the object detection model.

At 610, the method 600 can include updating one or more weights of the object detection model based on labels associated with the sensor data. In particular, the machine learning model can be a supervised learning process. In some implementations, the labels associated with the sensor data provide ground truth information regarding one or more objects and/or motion associated with the objects (e.g., perception data and/or prediction data).

Figure 6:
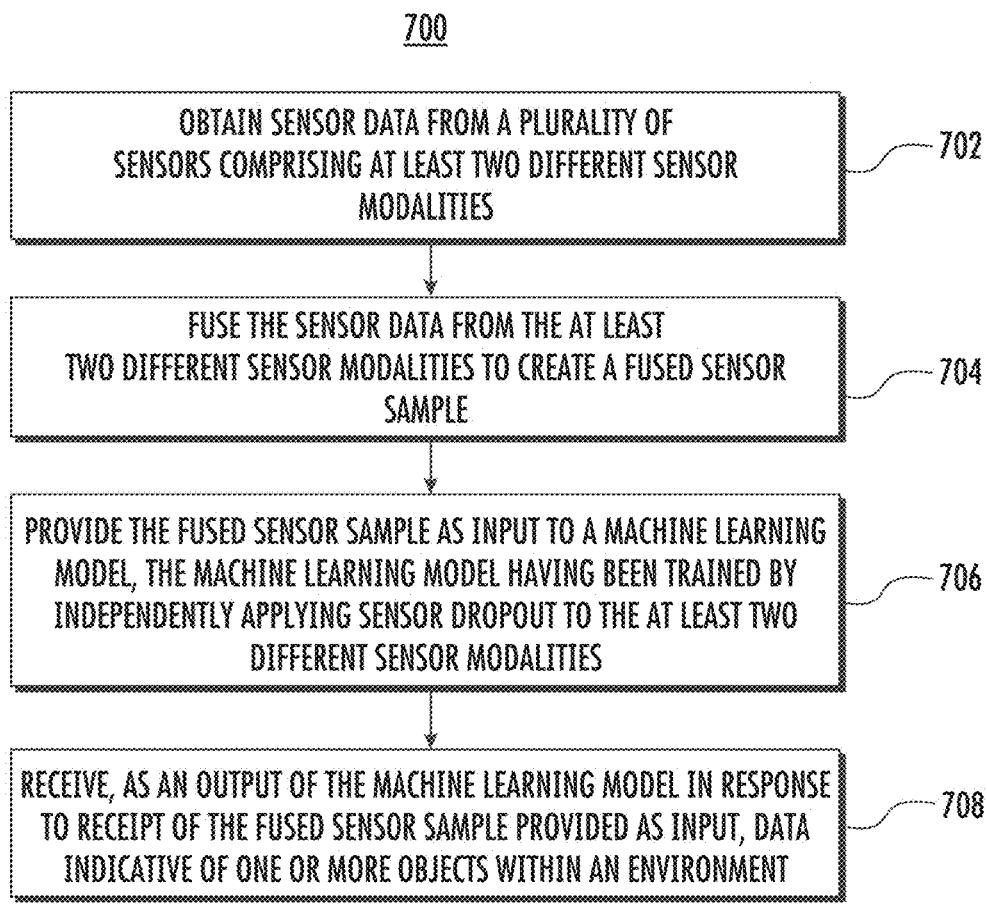
FIG. 6 depicts a flowchart of an example method of analyzing sensor data using a machine learning model according to aspects of the present disclosure.

FIG. 6 depicts another flowchart of a method 700 for detecting and predicting the motion of objects within the surrounding environment of a system such as an autonomous vehicle according to aspects of the present disclosure. One or more portion(s) of the method 700 can be implemented by a computing system that includes one or more computing devices such as, for example, the computing systems described with reference to the other figures (e.g., robotic platform 105, vehicle computing system 210, operations computing system(s) 290A, remote computing system(s) 290B, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1-3, 8, etc.), for example, to generate object determination data and object motion data. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 6 is described with reference to elements/terms described with respect to other systems and figures for exemplary illustrated purposes and is not meant to be limiting. One or more portions of method 700 can be performed additionally, or alternatively, by other systems.

At 702, the method 700 can include obtaining sensor data from a plurality of sensors comprising at least two different sensor modalities (e.g., the at least two different sensor modalities can include a RADAR system, LIDAR system, camera system, etc.). In particular, the sensor data can be obtained of a surrounding environment by employing a robotic platform (e.g., a three-hundred and sixty degree view). The robotic platform can include an autonomous vehicle. For example, a computing system (e.g., robotic platform 105, vehicle computing system 210, operations computing system(s) 290A, remote computing system(s) 290B, etc.) can obtain sensor data. As another example, the environment can include a real-world environment or a simulated environment. In some instances, the sensor data obtained at 702 can include radar sweep input 302, rasterized map data 304, lidar input 306, and RGB camera image 308 such as depicted in FIG. 3 (but in a configuration that excludes the sensor dropout at 314, 328, and/or 342).

At 704, the method 700 can include fusing the sensor data from the at least two different sensor modalities to create a fused sensor sample. For example, the computing system can fuse a first portion of the sensor data from a first branch comprising a range-view (RV) representation with a second portion of the sensor data from a second branch comprising a bird's-eye view (BEV) representation. In some instances, the fused sensor sample created at 704 can be similar to the feature tensor fusion data created at feature tensor fusion point 334 of FIG. 3 (but in a configuration that excludes the sensor dropout at 314, 328, and/or 342).

At 706, the method 700 can include providing the fused sensor sample as input to a machine learning model, the machine learning model having been trained by independently applying sensor dropout to the at least two different sensor modalities. For example, the fused sensor sample can be provided as input at 706 to a machine-learned model 400 such as depicted in FIG. 4 having been trained by independently applying sensor dropout as implemented by the system depicted in FIG. 3. The fused sensor sample can additionally or alternatively be provided to any number of different machine learned models, such as neural networks and/or other machine learned models dedicated to one or more autonomy tasks, including but not limited to object detection and/or motion prediction and/or motion planning.

At 708, the method 700 can include receiving, as an output of the machine learning model in response to receipt of the fused sensor sample provided as input at 706, data indicative of one or more objects within an environment. Again, depending on the trained tasks of the machine learning model, machine learning model outputs received at 708 can include object detection data, motion prediction data, or other state data associated with one or more objects in the environment.

Additional steps associated with method 700 of FIG. 6 can include steps associated with controlling an autonomous vehicle based on the data indicative of the one or more objects within the environment. For example, motion plan data and/or vehicle control signals can be generated for controlling motion of an autonomous vehicle based on the object detection data, motion prediction data, or other state data associated with one or more objects in the environment.

Figure 7:
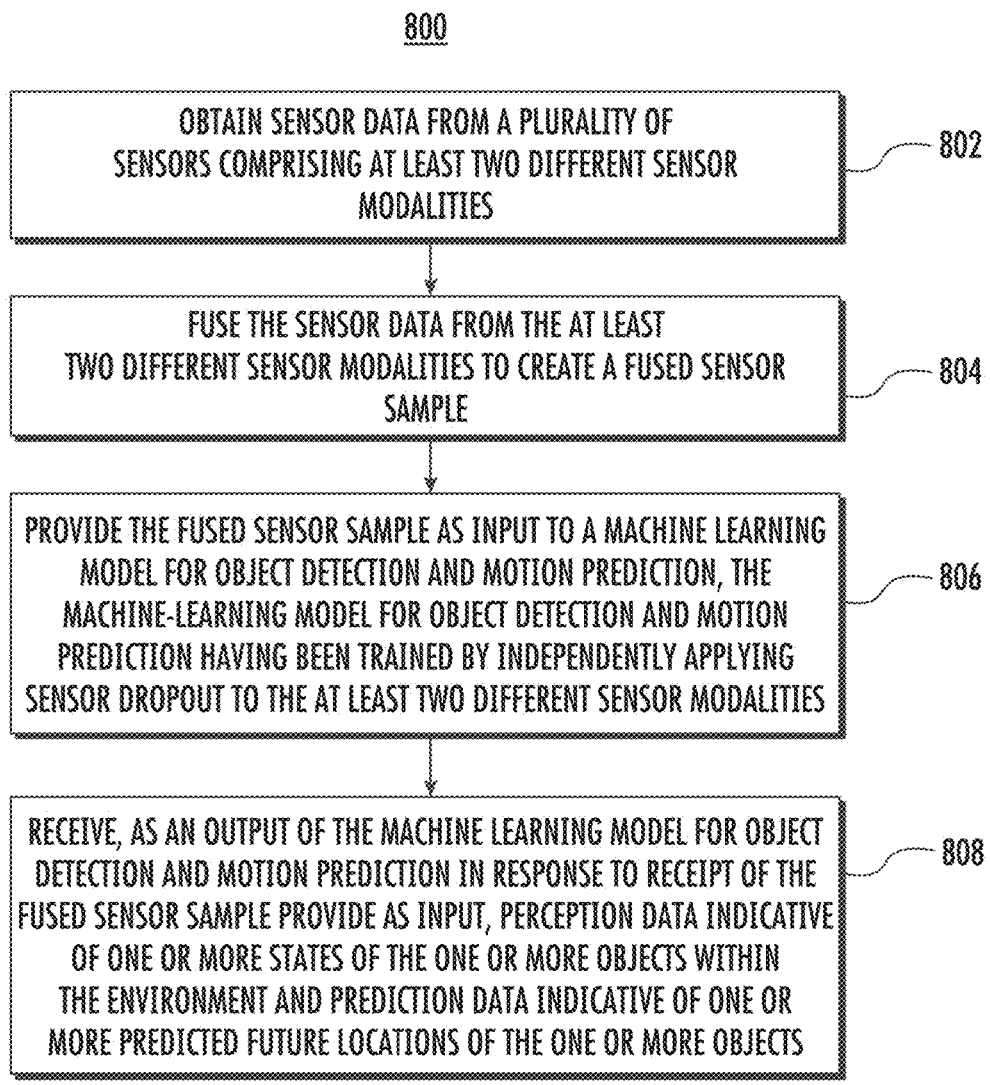
FIG. 7 depicts a flowchart of an example method of object detection and motion prediction using a machine learning model according to aspects of the present disclosure.

FIG. 7 depicts a flowchart of a method 800 for detecting and predicting the motion of objects within the surrounding environment of a system such as an autonomous vehicle according to aspects of the present disclosure. One or more portion(s) of the method 800 can be implemented by a computing system that includes one or more computing devices such as, for example, the computing systems described with reference to the other figures (e.g., robotic platform 105, vehicle computing system 210, operations computing system(s) 290A, remote computing system(s) 290B, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-3, 8, etc.), for example, to generate object determination data and object motion data. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 800 can be performed additionally, or alternatively, by other systems.

At 802, the method 800 can include obtaining sensor data from a plurality of sensors comprising at least two different sensor modalities (e.g., the at least two different sensor modalities can include a RADAR system, LIDAR system, camera system, etc.). In particular, the sensor data can be obtained of a surrounding environment by employing a robotic platform (e.g., a three-hundred and sixty degree view). The robotic platform can include an autonomous vehicle. For example, a computing system (e.g., robotic platform 105, vehicle computing system 210, operations computing system(s) 290A, remote computing system(s) 290B, etc.) can obtain sensor data. As another example, the environment can include a real-world environment or a simulated environment. In some instances, the sensor data obtained at 802 can include radar sweep input 302, rasterized map data 304, lidar input 306, and RGB camera image 308 such as depicted in FIG. 3 (but in a configuration that excludes the sensor dropout at 314, 328, and/or 342).

At 804, the method 800 can include fusing the sensor data from the at least two different sensor modalities to create a fused sensor sample. For example, the computing system can fuse a first portion of the sensor data from a first branch comprising a range-view (RV) representation with a second portion of the sensor data from a second branch comprising a bird's-eye view (BEV) representation. In some instances, the fused sensor sample created at 804 can be similar to the feature tensor fusion data created at feature tensor fusion point 334 of FIG. 3 (but in a configuration that excludes the sensor dropout at 314, 328, and/or 342).

At 806, the method 800 can include providing the fused sensor sample as input to a machine learning model for object detection and motion prediction. In particular, the machine-learning model for object detection and motion prediction can be trained by independently applying sensor dropout to the at least two different sensor modalities. For example, the fused sensor sample can be provided as input at 806 to a machine-learned model 400 such as depicted in FIG. 4 having been trained by independently applying sensor dropout as implemented by the system depicted in FIG. 3. The fused sensor sample can additionally or alternatively be provided to any number of different machine learned models, such as neural networks and/or other machine learned models dedicated to one or more autonomy tasks, including but not limited to object detection and/or motion prediction and/or motion planning.

At 808, the method 800 can include receiving, as an output of the machine learning model for object detection and motion prediction in response to receipt of the fused sensor sample provided as input, perception data indicative of one or more states of the one or more objects within the environment and prediction data indicative of one or more predicted future locations of the one or more objects.

Additional steps associated with method 800 of FIG. 7 can include steps associated with controlling an autonomous vehicle based on the perception data and/or prediction data. For example, motion plan data and/or vehicle control signals can be generated for controlling motion of an autonomous vehicle based on the perception data and/or prediction data and/or other data associated with one or more objects in the environment.

Figure 8:
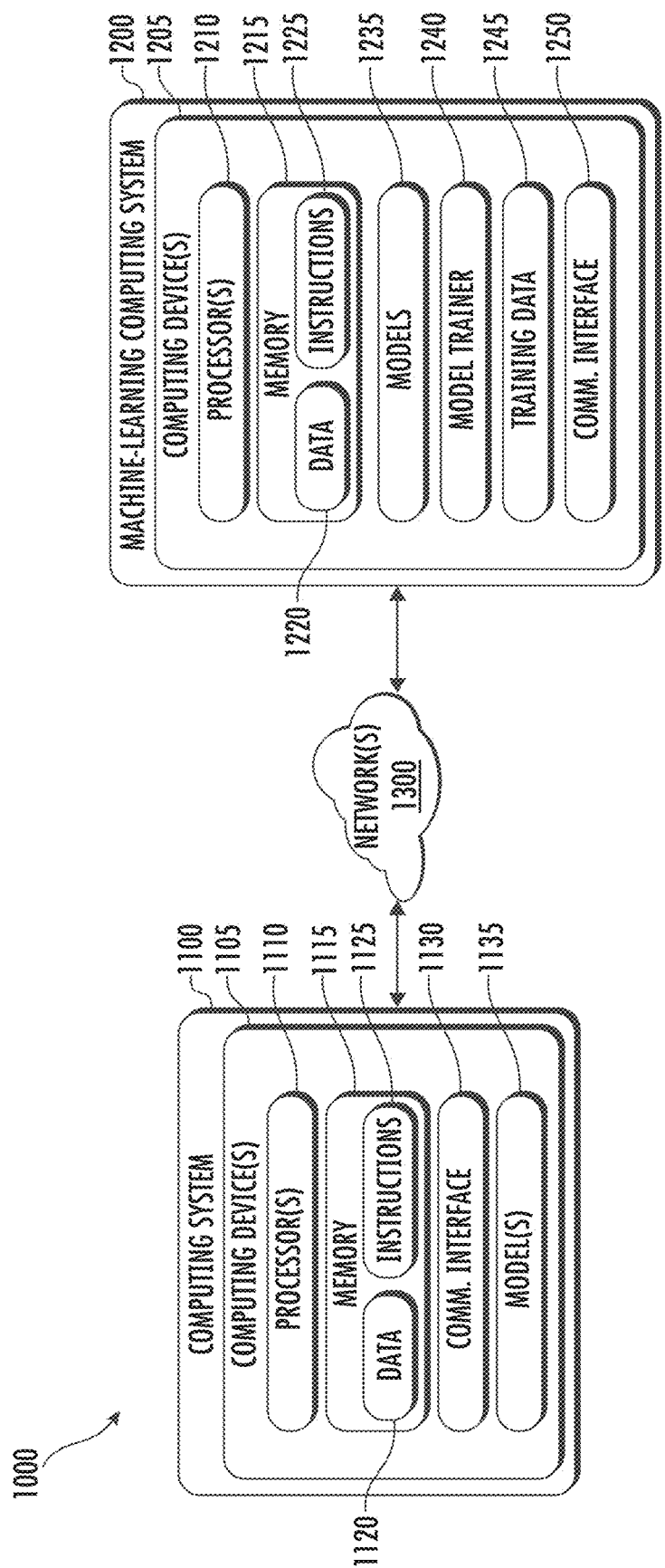
FIG. 8 depicts a block diagram of an example computing system according to example embodiments of the present disclosure.

FIG. 8 depicts a block diagram of an example system 1000 according to example embodiments of the present disclosure. The example system 1000 includes a computing system 1100 and a machine learning computing system 1200 that are communicatively coupled over one or more networks 1300.

In some implementations, the computing system 1100 can perform one or more observation tasks such as, for example, by obtaining sensor data associated with an environment. In some implementations, the computing system 1100 can be included in a robotic platform. For example, the computing system 1100 can be on-board an autonomous vehicle. In other implementations, the computing system 1100 is not located on-board a robotic platform. The computing system 1100 can include one or more distinct physical computing devices 1105.

The computing system 1100 (or one or more computing device(s) 1105 thereof) can include one or more processors 1110 and a memory 1115. The one or more processors 1110 can be any suitable processing device (e.g., a processor core, a microprocessor, an ASIC, a FPGA, a controller, a microcontroller, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The memory 1115 can store information that can be accessed by the one or more processors 1110. For instance, the memory 1115 (e.g., one or more non-transitory computer-readable storage mediums, memory devices, etc.) can store data 1120 that can be obtained, received, accessed, written, manipulated, created, or stored. The data 1120 can include, for instance, sensor data, sensor data packets, models, feature data, local feature maps, spatial maps, data associated with objects (e.g., classifications, bounding shapes, etc.), map data, simulation data, or any other data or information described herein. In some implementations, the computing system 1100 can obtain data from one or more memory device(s) that are remote from the computing system 1100.

The memory 1115 can also store computer-readable instructions 1125 that can be executed by the one or more processors 1110. The instructions 1125 can be software written in any suitable programming language or can be implemented in hardware. Additionally, or alternatively, the instructions 1125 can be executed in logically or virtually separate threads on processor(s) 1110. The memory 1115 can include a multi-scale memory, as described herein.

For example, the memory 1115 can store instructions 1125 that when executed by the one or more processors 1110 cause the one or more processors 1110 (the computing system 1100) to perform any of the operations, functions, or methods/processes described herein, including, for example, obtain sensor data, generate a local feature map, update a spatial map, determine an object is in the environment, control motion, generate simulation data, etc.

According to an aspect of the present disclosure, the computing system 1100 can store or include one or more machine-learned models 1135. As examples, the machine-learned models 1135 can be or can otherwise include various machine-learned models such as, for example, inpainting networks, generative adversarial networks, neural networks (e.g., deep neural networks, etc.), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks, etc.), convolutional neural networks, or other forms of neural networks.

In some implementations, the computing system 1100 can receive the one or more machine-learned models 1135 from the machine learning computing system 1200 over network(s) 1300 and can store the one or more machine-learned models 1135 in the memory 1115. The computing system 1100 can then use or otherwise implement the one or more machine-learned models 1135 (e.g., by processor(s) 1110, etc.). In particular, the computing system 1100 can implement the machine-learned model(s) 1135 to generate local feature maps, update spatial maps, or determine objects are in the environment.

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices, etc.) can store data 1220 that can be obtained, received, accessed, written, manipulated, created, or stored. The data 1220 can include, for instance, sensor data, sensor data packets, models, feature data, local feature maps, spatial maps, data associated with objects (e.g., classifications, etc.), map data, simulation data, data communicated to/from a vehicle, simulation data, or any other data or information described herein. In some implementations, the machine learning computing system 1200 can obtain data from one or more memory device(s) that are remote from the machine learning computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system) to perform any of the operations, functions, methods, or processes described herein, including, for example, training a machine-learned convolutional model, interpolation model, concatenation model, self-attention model, classification model, etc.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition, or alternatively to the model(s) 1235 at the computing system 1100, the machine learning computing system 1200 can include one or more machine-learned models 1235. As examples, the machine-learned models 1235 can be or can otherwise include various machine-learned models such as, for example, inpainting networks, generative adversarial networks, neural networks (e.g., deep neural networks, etc.), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks, etc.), convolutional neural networks, or other forms of neural networks.

In some implementations, the machine learning computing system 1200 or the computing system 1100 can train the machine-learned models 1135 or 1235 through use of a model trainer 1240. The model trainer 1240 can train the machine-learned models 1135 or 1235 using one or more training or learning algorithms. One example training technique is backwards propagation of errors. In some implementations, the model trainer 1240 can perform supervised training techniques using a set of labeled training data. In other implementations, the model trainer 1240 can perform unsupervised training techniques using a set of unlabeled training data. The model trainer 1240 can perform a number of generalization techniques to improve the generalization capability of the models being trained. Generalization techniques include weight decays, dropouts, or other techniques.

In particular, the model trainer 1240 can train a machine-learned model 1135 or 1235 based on a set of training data 1245. The training data 1245 can include, for example, labeled sequential sensor data indicative of portions of one or more environments at different timesteps. In some implementations, the training data can include environment(s) previously recorded by the autonomous vehicle with one or more objects. The model trainer 1240 can be implemented in hardware, firmware, or software controlling one or more processors.

Figure 9:
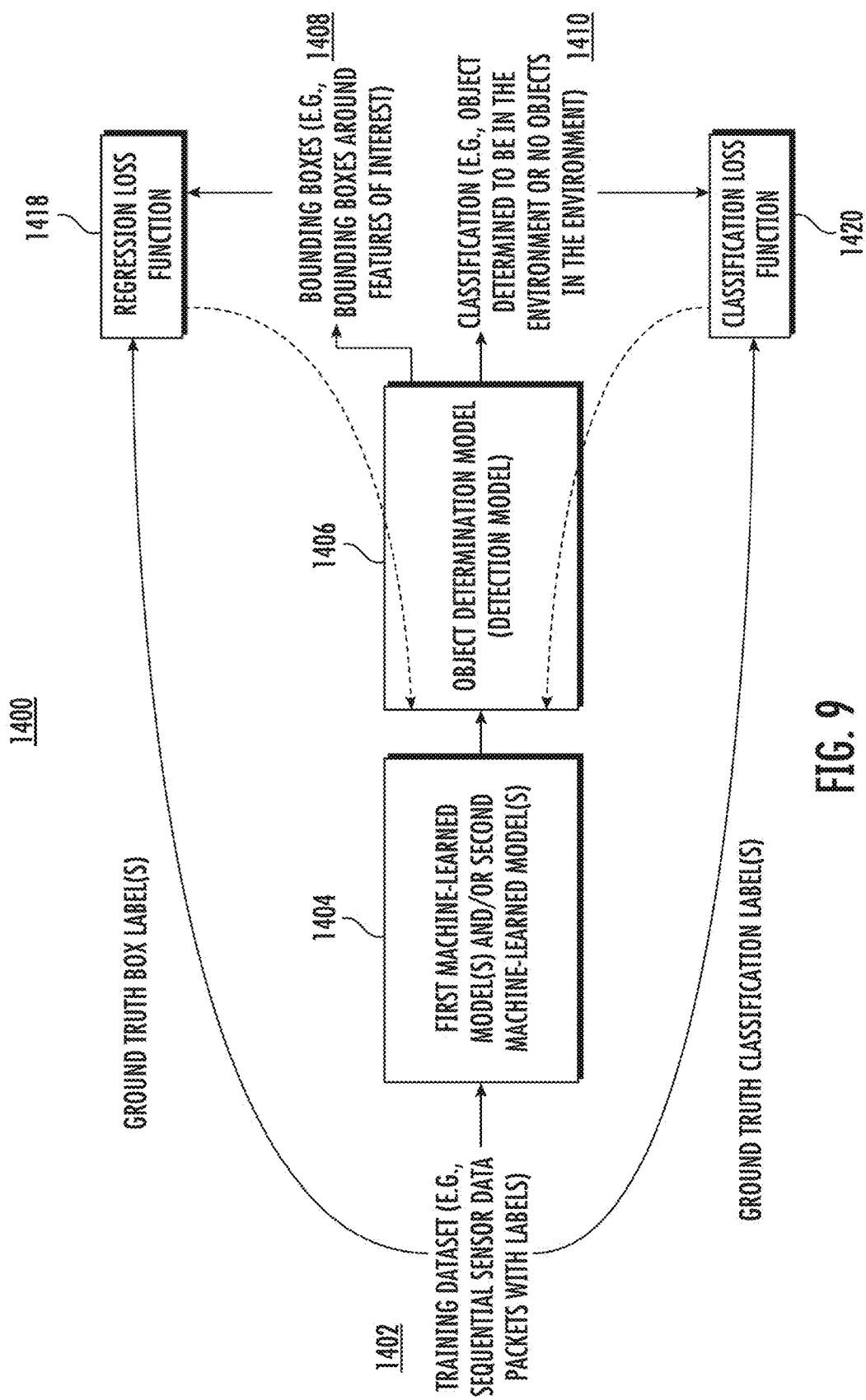
FIG. 9 depicts a block diagram of an example process for training one or more machine-learned models according to aspects of the present disclosure.

FIG. 9 depicts a block diagram of an example process 1400 for training one or more machine-learned models for sensor data dropout and related processing according to aspects of the present disclosure. More specifically, the example process 1400 depicts an example training process using a multi-task loss function.

The training process 1400 can include obtaining or generating a plurality of training datasets 1402. The training datasets 1402 can include a plurality of training sensor data packets, such as the outputs generated by example system 300 of FIG. 3. The training sensor data packets can include sequential packets that may be input into the one or more machine-learned models sequentially (e.g., chronologically, etc.). The training sensor data packets can be descriptive or indicative of one or more training environments with known depths and known objects. The training datasets 1402 can further include one or more labels (e.g., ground truth box labels indicating the actual location of objects and features and ground truth classification labels indicating the actual classification and score for the features identified in the environment, etc.).

The training sensor data packets can be input into a first machine-learned model 1404 to generate one or more local feature maps indicative of one or more local features. The one or more local feature maps can then be utilized to update one or more spatial maps. The spatial maps can be updated via interpolation and feature-wise concatenation techniques and may be updated via one or more second machine-learned models.

The updated spatial map can then be processed with the object determination model 1406 (e.g., a detection model or classification model, etc.). The object determination model 1406 can then output: (i) one or more bounding boxes 1408 indicative of feature clusters and their determined centroid and (ii) one or more classifications 1410 indicative of whether a feature cluster is indicative of an object or not.

The one or more bounding boxes 1408 can be compared against one or more ground truth box labels in order to evaluate a regression loss function 1418. Similarly, the one or more classifications 1410 can be compared against one or more ground truth classification labels in order to evaluate a classification loss function 1420. The resulting evaluations of the regression loss function 1418 and the classification loss function 1420 can be backpropagated. In response to the evaluations, one or more parameters of at least one of the first machine-learned model 1404, the second machine-learned model, or the object determination model 1406 may be adjusted based at least in part on the regression loss function 1418 or the classification loss function 1420.

Figure 10:
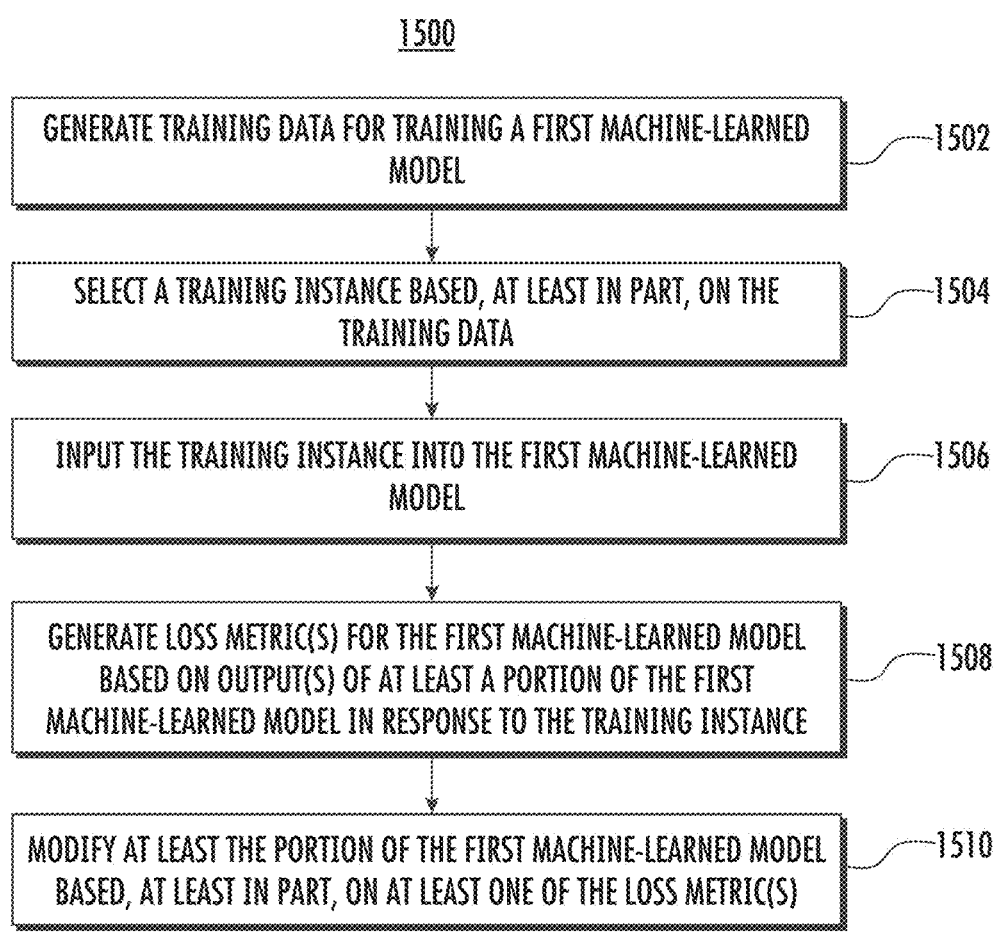
FIG. 10 depicts a flowchart of an example method for training a machine-learned model according to aspects of the present disclosure.

FIG. 10 depicts a flowchart of a method 1500 for training an example machine-learned model according to aspects of the present disclosure. One or more portion(s) of the method 1500 can be implemented by a computing system that includes one or more computing devices such as, for example, the computing systems described with reference to the other figures (e.g., a system of FIG. 7, etc.). Each respective portion of the method 1500 can be performed by any (or any combination) of one or more computing devices. Moreover, one or more portion(s) of the method 1500 can be implemented as an algorithm on the hardware components of the device(s) described herein (e.g., as in FIGS. 1-3, 7, etc.), for example, to train machine-learned models. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of method 1500 can be performed additionally, or alternatively, by other systems.

At 1502, the method 1500 can include generating training data for training a first machine-learned model. For example, a computing system (e.g., a model trainer, etc.) can generate the training data for training the first machine-learned model. The training data can include a plurality of training fused sensor samples having independent sensor dropout or a set of respective training labels for the plurality of training fused sensor samples having independent sensor dropout.

The training data can be collected using one or more robotic platforms (e.g., robotic platform 105, etc.) or the sensors thereof as the robotic platform is within its environment. By way of example, the training data can be collected using one or more autonomous vehicle(s) (e.g., robotic platform 105, vehicle 205, etc.) or sensors thereof as the vehicle(s) operates along one or more travel ways. The training data can include LIDAR point clouds (e.g., collected using LIDAR sensors of a robotic platform, etc.), RADAR sweeps (e.g., collected using RADAR sensors of a robotic platform, etc.), images (e.g., collected using camera sensors of a robotic platform, etc.) or high definition map information (e.g., structured lane topology data, etc.). The plurality of fused sensor samples and the plurality of maps can be scaled training and evaluation. In some implementations, a "ground-truth" labels or ground truth maps can be created in which objects, boxes, or features can be identified.

Due to the sequential nature of the spatial memory, the one or more machine-learned models can be trained sequentially through examples that contain a plurality of fused sensor samples, and backpropagation through time can be used to compute gradients across the memory. Furthermore, the one or more machine-learned models (e.g., the first machine learned model 1404, the second machine-learned model, and the classification model (e.g., the object determination model 1406), etc.) may also be trained to remember by supervising the model(s) on objects with 0 points as long as it was seen in any of the previous samples, as previously described herein. In practice, due to GPU memory constraints, the system may only compute the forward pass in the first subset of samples, then forward and backward through time in the last subset of samples.

At 1504, the method 1500 can include selecting a training instance based, at least in part, on the training data. For example, a computing system can select the training instance based, at least in part, on the training data. The training instance can include training fused sensor samples indicative of at least a portion of a surrounding environment with at least one object for detection.

For example, as described above, the training datasets 1402 can include a plurality of fused sensor samples from a plurality of different degree slices over a plurality of different timesteps. In addition, in some implementations, the training datasets can include a plurality of objects (e.g., synthetic three-dimensional object meshes such as car meshes, pedestrian meshes, etc.) rendered within the fused sensor samples. Each object can be assigned one or more feasible trajectories and rendered within at least one of the plurality of fused sensor samples of the training dataset based, at least in part, on the respectively assigned trajectory. In some implementations, the feasible trajectories can be determined based, at least in part, on one or more heuristics such as, for example, vehicle (1) can only travel along lanes; (2) can randomly turn left, right, or continue straight at each intersection; (3) cannot interfere with one another; or any other heuristic for controlling the motion of objects rendered within the training sequence.

At 1506, the method 1500 can include inputting the training instance into the first machine-learned model. For example, a computing system can input the training instance into the first machine-learned model.

At 1508, the method 1500 can include generating loss metric(s) for the first machine-learned model based on output(s) of at least a portion of the first machine-learned model in response to the training instance. For example, a computing system can generate the loss metric(s) for the first machine-learned model based on the output(s) of at least the portion of the first machine-learned model in response to the training instance. The loss metric(s), for example, can include at least one of a regression loss (e.g., a weighted sum of L1 losses, etc.), a classification loss, adversarial loss, a multi-task loss, or a perceptual loss.

In some implementations, the loss metric(s) can be associated with a plurality of loss terms. The loss terms can include at least a first loss term associated with the determination or generation of bounding boxes, a second loss term associated with the classification of features, or a third loss term associated with the generation of a two-dimensional representations, or a fourth loss term associated with the extraction of local features from a two-dimensional representation. For example, the regression loss metric (e.g., the first loss term associated with the determination or generation of bounding boxes, etc.) can quantify the accuracy of the predicted bounding boxes output by at least a portion of the one or more machine-learned model(s). As another example, the fine-classification loss metric (e.g., the second loss term associated with the classification of features, etc.) can quantify the accuracy of the classification or object determination output by at least another portion of the one or more machine-learned model(s).

At 1510, the method 1500 can include modifying at least the portion of the first machine-learned model based, at least in part, on at least one of the loss metric(s). For example, a computing system can modify at least the portion of the first machine-learned model based, at least in part, on at least one of the loss metric(s). For example, the first machine-learned model can be trained with a multi-task loss function (denoted as $\mathcal{L}$).

The first machine-learned model (or portion thereof) can be modified to minimize a loss function associated with the loss metric(s). For example, the first machine-learned model can be trained with a multi-task loss function (denoted as $\mathcal{L}$) to minimize a Wasserstein distance. By way of example, the model can be trained over the overall training function:

$$\mathcal{L} = \mathcal{L}_{reg} + \alpha \mathcal{L}_{cls}$$

The terms of the overall training function can include a first term indicative of the regression loss metric. The regression loss can include a weighted sum of the smooth L1 loss between the predicted box parameters and the ground truth (as denoted below).

$$\mathcal{L}_{reg}(y, \hat{y}) = \frac{1}{N} \sum_{i=0}^{N} \sum_{d \in (x, y, \log w, \log l, \theta_1, \theta_2)} \gamma_d \times \text{smooth}_{L1}(y_d^i - \hat{y}_d^i)$$

$$\text{smooth}_{L1}(x) = \begin{cases} 0.5x^2 & \text{if } |x| \le 1 \\ |x| - 0.5 & \text{otherwise} \end{cases}.$$

The regression loss can include γ values of 1.0 for x, y, log w, log l, and 2.0 for $\theta_1$, $\theta_2$ can be used. For pedestrians the log w, log l, $\theta_1$, and $\theta_2$ can be omitted as the metric may only be concerned with predicting the centroid (x and y).

In addition, the terms can include a second term indicative of the classification loss metric. The classification loss can include a binary cross entropy between the predicted classification scores and the ground truth. Due to a severe imbalance between positive and negative anchors given that most pixels in the BEV scene do not contain an object, the metric can employ hard negative mining. Thus, the loss can become:

$$\mathcal{L}_{cls}(y, \hat{y}) = \frac{1}{N} \sum_{i=0}^{N} \hat{y}_{pos}^i + \frac{1}{K} \sum_{i=0}^{N} \mathbb{1}[i \in N_K](1 - \hat{y}_{neg}^i)\log(1 - y),$$

where K can be a set containing K hard negative anchors. The set can be obtained by first randomly sampling different classes of objects, and then picking a certain number (e.g., 20, etc.) with highest loss for each class.

In addition, the terms of the overall training function can include one or more other terms for evaluating one or more other parameters of the one or more machine-learned models. Although FIG. 10 describes systems and methods for training the first machine-learned model, similar methods and systems can be applied to train the one or more second machine-learned models and the one or more object determination models disclosed herein.

Returning to FIG. 8, the computing system 1100 and the machine learning computing system 1200 can each include a communication interface 1130 and 1250, respectively. The communication interfaces 1130/1250 can be used to communicate with one or more systems or devices, including systems or devices that are remotely located from the computing system 1100 and the machine learning computing system 1200. A communication interface 1130/1250 can include any circuits, components, software, etc. for communicating with one or more networks 1300. In some implementations, a communication interface 1130/1250 can include, for example, one or more of a communications controller, receiver, transceiver, transmitter, port, conductors, software or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1300 can be accomplished, for instance, through a network interface using any type of protocol, protection scheme, encoding, format, packaging, etc.

FIG. 8 illustrates one example computing system 1000 that can be used to implement the present disclosure. Other computing systems can be used as well. For example, in some implementations, the computing system 1100 can include the model trainer 1240 and the training dataset 1245. In such implementations, the machine-learned models 1235 can be both trained and used locally at the computing system 1100. As another example, in some implementations, the computing system 1100 is not connected to other computing systems.

In addition, components illustrated or discussed as being included in one of the computing systems 1100 or 1200 can instead be included in another of the computing systems 1100 or 1200. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using phrases, sentences, lists, etc. of example elements joined by conjunctions such as "and," "or," "but," etc. It should be understood that such conjunctions are provided for explanatory purposes only. Lists joined by a particular conjunction such as "or", for example, can refer to "at least one of", "and/or", or "any combination of" example elements listed therein.

What is claimed is:

1. A computer-implemented method comprising:
   (a) obtaining sensor data from a plurality of sensors comprising at least two different sensor modalities;
   (b) applying independent sensor dropout to the at least two different sensor modalities;
   (c) fusing the sensor data from the at least two different sensor modalities with sensor dropout independently applied thereto to generate a fused sensor sample;
   (d) generating a training data set comprising the fused sensor sample; and
   (e) training a machine-learned model for object detection using the training data set, wherein the trained machine-learned model is employed by a robotic platform operating within an environment.

2. The computer-implemented method of claim 1, wherein the robotic platform comprises an autonomous vehicle.

3. The computer-implemented method of claim 1, wherein the environment comprises a real-world environment or a simulated environment.

4. The computer-implemented method of claim 1, wherein the trained machine-learned model comprises an end-to-end model that is configured to jointly perform object detection and motion prediction.

5. The computer-implemented method of claim 1, wherein (b) comprises independently applying sensor dropout to each of the at least two different sensor modalities at a fixed probability associated with the sensor modality.

6. The computer-implemented method of claim 1, wherein the plurality of sensors comprise a RADAR system, a LIDAR system, and a camera.

7. The computer-implemented method of claim 6, wherein:
   the at least two different sensor modalities comprise at least one of the RADAR system or the camera; and
   (b) comprises zeroing out a final feature vector for a portion of the sensor data obtained from the at least one of the RADAR system or the camera.

8. The computer-implemented method of claim 6, wherein:
   the at least two different sensor modalities comprise the LIDAR system; and
   (b) comprises replacing a LIDAR intensity value with a sentinel value for a portion of the sensor data obtained from the LIDAR system.

9. The computer-implemented method of claim 1, wherein (e) comprises:
   inputting the fused sensor sample into the machine-learned model;
   generating a loss metric for the machine-learned model based on output of at least a portion of the machine-learned model in response to the fused sensor sample as input; and
   modifying at least a portion of the machine-learned model based on the loss metric.

10. The computer-implemented method of claim 9, wherein the loss metric comprises at least one of a regression loss, a classification loss, an adversarial loss, a multi-task loss, or a perceptual loss.

11. The computer-implemented method of claim 9, wherein the loss metric is associated with a plurality of loss terms, the plurality of loss terms comprising at least a first loss term associated with a determination or generation of bounding shapes.

12. The computer-implemented method of claim 11, the plurality of loss terms further comprising at least a second loss term associated with a classification of features.

13. A training computing system, comprising:
   one or more processors; and
   one or more non-transitory computer-readable medium storing instructions that when executed by the one or more processors cause the training computing system to perform operations, the operations comprising:
     (a) obtaining sensor data from a plurality of sensors comprising at least two different sensor modalities;
     (b) applying independent sensor dropout to the at least two sensor modalities;
     (c) fusing the sensor data from the at least two different sensor modalities with sensor dropout independently applied thereto to generate a fused sensor sample;
     (d) generating a training data set comprising the fused sensor sample; and
     (e) training a machine-learned model for object detection using the training data set, wherein the trained machine-learned model is employed by a robotic platform operating within an environment.

14. The training computing system of claim 13, wherein the robotic platform comprises an autonomous vehicle.

15. The training computing system of claim 13, wherein the environment comprises a real-world environment or a simulated environment.

16. The training computing system of claim 13, wherein the trained machine-learned model comprises an end-to-end model that is configured to jointly perform object detection and motion prediction.

17. The training computing system of claim 13, wherein (b) comprises independently applying sensor dropout to each of the at least two different sensor modalities at a fixed probability associated with the sensor modality.

18. The training computing system of claim 13, wherein (e) comprises:
   inputting the fused sensor sample into the machine-learned model;
   generating a loss metric for the machine-learned model based on output of at least a portion of the machine-learned model in response to the fused sensor sample as input; and
   modifying at least a portion of the machine-learned model based on the loss metric.

19. The training computing system of claim 18, wherein the loss metric comprises one or more of a regression loss and a classification loss.

20. One or more non-transitory computer-readable medium storing instructions that when executed by one or more processors cause the one or more processors to perform operations, the operations comprising:
- (a) obtaining sensor data from a plurality of sensors comprising at least two different sensor modalities;
- (b) applying independent sensor dropout to the at least two sensor modalities;
- (c) fusing the sensor data from the at least two different sensor modalities with sensor dropout independently applied thereto to generate a fused sensor sample;
- (d) generating a training data set comprising the fused sensor sample; and
- (e) training a machine-learned model for object detection using the training data set, wherein the trained machine-learned model is employed by a robotic platform operating within an environment.

* * * * *